US012645578B2

(12) United States Patent (10) Patent No.: US 12,645,578 B2
Botman et al. (45) Date of Patent: Jun. 2, 2026

(54) APPARATUS AND METHOD FOR MANAGING CAPABILITIES

(71) Applicant: Arm Limited, Cambridge (GB)

(72) Inventors: François Christopher Jacques Botman, Cambridge (GB); Thomas Christopher Grocutt, Cambridge (GB); Hugo John Martin Vincent, Cambridge (GB); Christopher Alan Reed, Austin, TX (US)

(73) Assignee: Arm Limited, Cambridge (GB)

( * ) Notice: Subject to any disclaimer, the term of this patent is extended or adjusted under 35 U.S.C. 154(b) by 64 days.

(21) Appl. No.: 17/726,065

(22) Filed: Apr. 21, 2022

(65) Prior Publication Data

US 2023/0342289 A1 Oct. 26, 2023

(51) Int. Cl.
| | |
|---|---|
| *G06F 12/02* | (2006.01) |
| *G06F 3/06* | (2006.01) |
| *G06F 12/14* | (2006.01) |

(52) U.S. Cl.
CPC ............ *G06F 12/023* (2013.01); *G06F 12/14* (2013.01); *G06F 2212/70* (2013.01)

(58) Field of Classification Search
CPC ..... G06F 12/023; G06F 12/14; G06F 2212/70
(Continued)

(56) References Cited

U.S. PATENT DOCUMENTS

2013/0013965 A1* 1/2013 Guillemin ............... G06F 21/52
714/48
2016/0358640 A1* 12/2016 Brederlow ........... G11C 11/221
(Continued)

FOREIGN PATENT DOCUMENTS

| GB | 2586276 | 2/2021 | |
|---|---|---|---|
| KR | 101473253 B1 * | 12/2014 | ............. G06F 12/00 |

OTHER PUBLICATIONS

Translation of KR 101473253 B1 (Year: 2014).*
(Continued)

*Primary Examiner* — Arpan P. Savla
*Assistant Examiner* — Sidney Li
(74) *Attorney, Agent, or Firm* — NIXON & VANDERHYE P.C.

(57) ABSTRACT

An apparatus is described having processing circuitry for performing operations during which access requests to memory are generated. The processing circuitry generates memory addresses for the access requests using capabilities, where each capability indicates a pointer value and constraining information used to constrain access to memory using memory addresses derived from the pointer value. A marker indication field is stored in association with each capability to provide a marker value used to distinguish between static capabilities used to access statically allocated memory and dynamic capabilities used to access dynamically allocated memory. Capability tracking circuitry maintains a tracking structure providing a tracking field for each of a plurality of memory regions, and the capability tracking circuitry sets the tracking field for a given memory region amongst the plurality of memory regions when at least one capability whose associated marker indication field has a specified marker value is written to the given memory region. The specified marker value indicates that writing of the associated capability to memory is to be tracked by the capability tracking circuitry to facilitate subsequent revocation of that associated capability.

24 Claims, 17 Drawing Sheets

(58) Field of Classification Search
USPC ......................................................... 711/213
See application file for complete search history.

(56) References Cited

U.S. PATENT DOCUMENTS

| | | | | |
|---|---|---|---|---|
| 2018/0349294 A1* | 12/2018 | Barnes | ................ | G06F 9/30105 |
| 2019/0107957 A1* | 4/2019 | Helmick | ............... | G06F 3/0688 |
| 2019/0272159 A1* | 9/2019 | Pizlo | ....................... | G06F 8/434 |
| 2019/0387124 A1* | 12/2019 | Watanabe | .......... | H04N 1/32577 |
| 2020/0218471 A1* | 7/2020 | Chen | ..................... | G06F 3/0631 |
| 2020/0218619 A1* | 7/2020 | Hwang | .............. | G06F 16/1815 |
| 2021/0232511 A1* | 7/2021 | Boettcher | ........... | G06F 12/0253 |
| 2021/0294748 A1* | 9/2021 | Boettcher | ........... | G06F 12/0891 |

OTHER PUBLICATIONS

International Search Report and Written Opinion of the International Searching Authority for PCT/GB2023/050609 mailed Jun. 21, 2023, 16 pages.
Robert Bedichek, "Some Efficient Architecture Simulation Techniques", Proceedings of the Winter 1990 USENIX Conference, Jan. 22-26, 1990, 12 pages.
Office Action for IN Application No. 202417079032 dated Dec. 18, 2025, 8 pages.

* cited by examiner

CAPABILITY
ALLOCATION
(E.G. DONE IN
RESPONSE TO
BLOCK OF MEMORY
BEING ALLOCATED)

CAPABILITY
TO BE ALLOCATED
FOR USE BY PROCESSING
CIRCUITRY? — 150

N

Y

IS
CAPABILITY
TO BE TRACKED
(E.G. YES IF DYNAMICALLY
ALLOCATED, NO IF
STATICALLY
ALLOCATED
?) — 155

N

Y

SET MARKER VALUE
TO INDICATE TRACKED
CAPABILITY — 160

CLEAR MARKER
VALUE TO
INDICATE
UNTRACKED
CAPABILITY — 165

TRACKING STRUCTURE

| MEMORY REGION | TRACKING FIELD |
|---|---|
| | |
| | |
| | |
| | |
| | |

FIG. 5B

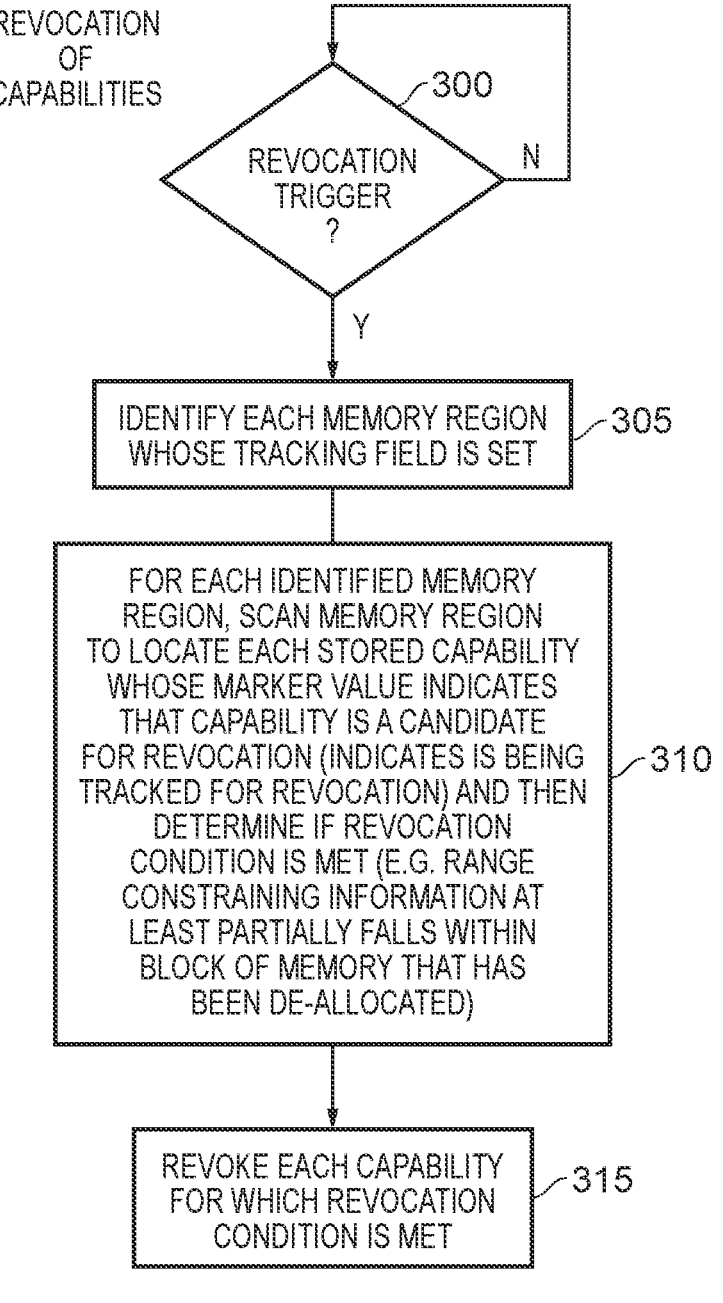

REVOCATION
OF
CAPABILITIES

REVOCATION
TRIGGER
?
300

N

Y

IDENTIFY EACH MEMORY REGION
WHOSE TRACKING FIELD IS SET
305

FOR EACH IDENTIFIED MEMORY
REGION, SCAN MEMORY REGION
TO LOCATE EACH STORED CAPABILITY
WHOSE MARKER VALUE INDICATES
THAT CAPABILITY IS A CANDIDATE
FOR REVOCATION (INDICATES IS BEING
TRACKED FOR REVOCATION) AND THEN
DETERMINE IF REVOCATION
CONDITION IS MET (E.G. RANGE
CONSTRAINING INFORMATION AT
LEAST PARTIALLY FALLS WITHIN
BLOCK OF MEMORY THAT HAS
BEEN DE-ALLOCATED)
310

REVOKE EACH CAPABILITY
FOR WHICH REVOCATION
CONDITION IS MET
315

FIG. 6

PERFORMANCE OF STEP 310 IF SEPARATE AREA
OF MEMORY USED FOR TAG AND MARKER BITS
(PERFORMED FOR EACH MEMORY REGION
WHOSE TRACKING FIELD IS SET)

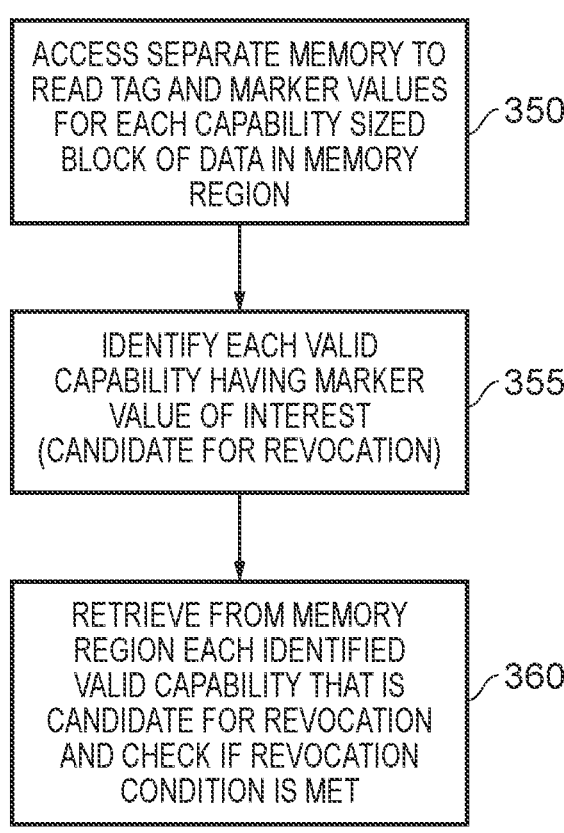

ACCESS SEPARATE MEMORY TO
READ TAG AND MARKER VALUES
FOR EACH CAPABILITY SIZED
BLOCK OF DATA IN MEMORY
REGION — 350

IDENTIFY EACH VALID
CAPABILITY HAVING MARKER
VALUE OF INTEREST
(CANDIDATE FOR REVOCATION) — 355

RETRIEVE FROM MEMORY
REGION EACH IDENTIFIED
VALID CAPABILITY THAT IS
CANDIDATE FOR REVOCATION
AND CHECK IF REVOCATION
CONDITION IS MET — 360

FIG. 7

SINGLE BIT MARKER INDICATION FIELD

E.G.   1 = TRACK CAPABILITY
       0 = DON'T TRACK CAPABILITY

MULTI-BIT MARKER INDICATION FIELD

- 0....0 = DON'T TRACK CAPABILITY
- MARKER VALUE USED TO INDICATE
  A CAPABILITY IS TO BE TRACKED IS
  DEPENDENT ON ALLOCATION CONDITION
  PRESENT AT TIME CAPABILITY IS
  ALLOCATED FOR USE

APPARATUS AND METHOD FOR MANAGING CAPABILITIES

BACKGROUND

The present technique relates to the field of data processing, and more particularly to a technique for managing capabilities.

There is increasing interest in capability-based architectures in which certain capabilities are defined for a given process, and an error can be triggered if there is an attempt to carry out operations outside the defined capabilities. The capabilities can take a variety of forms, but one type of capability is a bounded pointer (which may also be referred to as a "fat pointer").

Each capability can include constraining information that is used to restrict the operations that can be performed when using that capability. For instance, considering a bounded pointer, this may provide information used to identify a non-extendable range of memory addresses accessible by processing circuitry when using that capability, along with one or more permission flags identifying associated permissions.

When a block of memory is allocated, for example to enable that block of memory to be used by processing circuitry when performing data processing operations, one or more capabilities may be provided for use when accessing the allocated block of memory. A problem that may arise is that when the block of memory is later deallocated, freeing up that memory space for reallocation, the above-mentioned one or more capabilities may still be available to the processing circuitry. The potential use of such a capability after the associated block of memory has been deallocated is referred to as a "use-after-free" problem. In particular, use of a capability after the associated block of memory has been deallocated can give rise to undefined behaviour of software if that use occurs due to a programming error. Additionally, when such use of a capability occurs as an action intentionally caused by a security attacker, this can potentially lead to a security leak of information, and/or remote code execution.

Accordingly, it would be desirable to provide a technique which alleviated the use-after-free problem.

SUMMARY

In one example arrangement, there is provided an apparatus comprising: processing circuitry to perform operations during which access requests to memory are generated, wherein the processing circuitry is arranged to generate memory addresses for the access requests using capabilities, where each capability is arranged to indicate a pointer value and constraining information used to constrain access to memory using memory addresses derived from the pointer value, and wherein a marker indication field is stored in association with each capability to provide a marker value used to distinguish between static capabilities used to access statically allocated memory and dynamic capabilities used to access dynamically allocated memory; and capability tracking circuitry to maintain a tracking structure providing a tracking field for each of a plurality of memory regions, wherein the capability tracking circuitry is arranged to set the tracking field for a given memory region amongst the plurality of memory regions when at least one capability whose associated marker indication field has a specified marker value is written to the given memory region, where the specified marker value indicates that writing of the associated capability to memory is to be tracked by the capability tracking circuitry to facilitate subsequent revocation of that associated capability.

In another example arrangement, there is provided a method of operating an apparatus to track capabilities for revocation, comprising: employing processing circuitry to perform operations during which access requests to memory are generated, wherein the processing circuitry generates memory addresses for the access requests using capabilities, where each capability is arranged to indicate a pointer value and constraining information used to constrain access to memory using memory addresses derived from the pointer value; storing a marker indication field in association with each capability to provide a marker value used to distinguish between static capabilities used to access statically allocated memory and dynamic capabilities used to access dynamically allocated memory; maintaining, using capability tracking circuitry, a tracking structure providing a tracking field for each of a plurality of memory regions; and setting the tracking field for a given memory region amongst the plurality of memory regions when at least one capability whose associated marker indication field has a specified marker value is written to the given memory region, where the specified marker value indicates that writing of the associated capability to memory is to be tracked by the capability tracking circuitry to facilitate subsequent revocation of that associated capability.

In a still further example arrangement, there is provided a computer program for controlling a host data processing apparatus to provide an instruction execution environment, comprising: processing program logic to perform operations during which access requests to memory are generated, wherein the processing program logic is arranged to generate memory addresses for the access requests using capabilities, where each capability is arranged to indicate a pointer value and constraining information used to constrain access to memory using memory addresses derived from the pointer value, and wherein a marker indication field is stored in association with each capability to provide a marker value used to distinguish between static capabilities used to access statically allocated memory and dynamic capabilities used to access dynamically allocated memory, and capability tracking program logic to maintain a tracking structure providing a tracking field for each of a plurality of memory regions, wherein the capability tracking program logic is arranged to set the tracking field for a given memory region amongst the plurality of memory regions when at least one capability whose associated marker indication field has a specified marker value is written to the given memory region, where the specified marker value indicates that writing of the associated capability to memory is to be tracked by the capability tracking program logic to facilitate subsequent revocation of that associated capability. The computer program may be provided in a non-transitory or a transitory form.

BRIEF DESCRIPTION OF THE DRAWINGS

The present technique will be described further, by way of illustration only, with reference to examples thereof as illustrated in the accompanying drawings, in which:

FIG. 5B illustrates one example arrangement of a tracking structure that may be used when performing the process of FIG. 5A in accordance with one example implementation;

FIG. 6 is a flow diagram illustrating steps performed upon detection of a revocation trigger, in accordance with one example implementation;

FIG. 7 is a flow diagram illustrating a sequence of steps that may be used to implement step 310 of FIG. 6 in one example implementation, where the valid capability indications and marker indications are stored in a separate area of memory as per the example arrangement of FIG. 3B;

DESCRIPTION OF EXAMPLES

Figure 1:
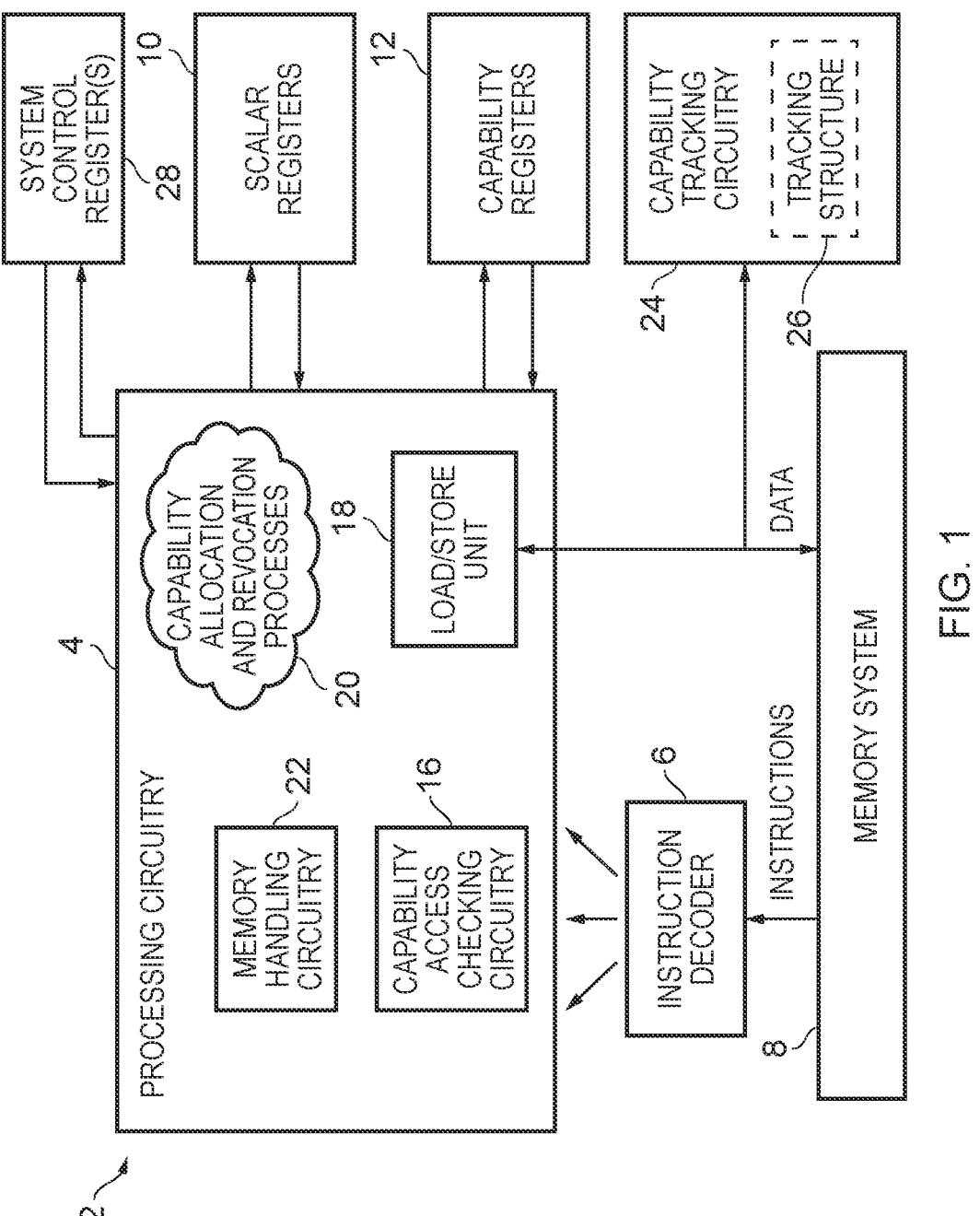
FIG. 1 is a block diagram of an apparatus in accordance with one example implementation.

In accordance with the techniques described herein, an apparatus is provided that has processing circuitry for performing operations during which access requests to memory are generated. The processing circuitry is arranged to generate memory addresses for the access requests using capabilities, where each capability is arranged to indicate a pointer value and constraining information used to constrain access to memory using memory addresses derived from the pointer value. In some implementations, the capabilities may also include additional metadata in addition to the constraining information. The memory address generated by the processing circuitry may be a virtual address in systems where address translation is performed, or alternatively may be a physical address in systems that do not support address translation.

There are a number of ways in which the constraining information (and indeed any additional metadata provided in addition to the constraining information) can be identified by the associated capability. For example, the capability might directly contain the constraining information in one example implementation. However, in an alternative implementation, the capability may instead indicate (directly or indirectly) a location in memory where the constraining information is located.

Software executing on a data processing apparatus may use pointers to control access to memory. However, pointers can sometimes provide an avenue which a malicious attacker could use to attack victim software, for example exploiting buffer overflows to use a pointer for identifying a location in a buffer to access a region of memory beyond the buffer which the attacker would not otherwise be allowed to access. As mentioned earlier, some processor architectures may support use of capabilities, which associate the pointer with constraining information specifying one or more use-limiting conditions which limit the scenarios in which the pointer can validly be used. This can help to protect against some forms of attack.

Whilst the use of capabilities can provide strong spatial memory protection in relation to memory accesses, capabilities do not naturally provide temporal protection. This means that once a capability has been issued, it cannot typically be de-issued and that capability hence retains the rights to access memory. For example, if software issues a capability as part of a dynamic memory allocation procedure (e.g. "malloc( )"), then regardless of any future deallocation procedures (e.g. "free ( )") that capability will retain permission to access memory. This is generally undesirable, and as mentioned earlier such "use-after-free" effects could potentially be abused by attackers to cause software to behave in problematic ways, potentially leading to a system exploit. The techniques described herein are aimed at alleviating such issues.

In accordance with the techniques described herein, a marker indication field is stored in association with each capability to provide a marker value used to distinguish between static capabilities used to access statically allocated memory and dynamic capabilities used to access dynamically allocated memory. Capabilities may be established for use by the processing circuitry in a variety of ways. For instance, in one example implementation a set of root capabilities may be provided in memory, and other capabilities may then be derived from those root capabilities (typically it will only be possible when deriving such a capability to arrange that derived capability to have constraining information that is more restrictive, and at least no less restrictive, than the capability from which it is derived). Capabilities that can be used to access statically allocated areas of memory (which can take a variety of forms, for example flash memory, statically allocated stack objects, SRAM data structures or peripherals) (such capabilities being referred to herein as static capabilities) can be arranged in accordance with the techniques used herein to have a marker value that indicates that fact, whilst capabilities that can be used to access dynamically allocated areas of memory (for example areas of memory that are available to allocate using memory allocation procedures such as malloc) (such capabilities being referred to herein as dynamic capabilities) can be arranged in accordance with the techniques used herein to have a marker value that is distinct from the marker value used in association with static capabilities.

It should be noted that whilst in one example implementation the marker indication field may be a single bit field to distinguish between static capabilities and dynamic capabilities, in an alternative implementation the marker indication field may be a multi-bit field, for example to enable a distinction to be made between various different forms of dynamic capability.

In addition to the above-mentioned marker indication field that is stored in association with each capability, the apparatus described herein further provides capability tracking circuitry that can be used to maintain a tracking structure providing a tracking field for each of a plurality of memory regions. The size of the memory regions for which the tracking structure provides a tracking field may be varied dependent on implementation, thus allowing the capability tracking circuitry to track at either a coarse-grained or fine-grained level, or indeed for a mixture of different sized memory regions.

The capability tracking circuitry is arranged to set the tracking field for a given memory region amongst the plurality of memory regions when at least one capability whose associated marker indication field has a specified marker value is written to the given memory region, where the specified marker value indicates that writing of the associated capability to memory is to be tracked by the capability tracking circuitry to facilitate subsequent revocation of that associated capability. The specified marker value may for example indicate that the associated capability is a dynamic capability, and in implementations where the marker value can be a multi-bit value to distinguish between different forms of dynamic capability, the capability tracking circuitry could for example be arranged to only track dynamic capabilities of a particular form if desired.

The tracking field can take a variety of forms, and hence in one example implementation may be a single bit field that is set when a capability having the specified marker value is written to the memory region associated with that tracking field. However, in an alternative implementation the tracking field may be a multi-bit field, to allow more detailed information to be captured. For example, the tracking field may take the form of a saturating counter that can be used to track the number of instances of capabilities having the specified marker value that have been written to the associated memory region, with for example the capability tracking circuitry incrementing the saturating counter for a given memory region each time a capability whose associated marker indication field has the specified marker value is written to that given memory region. In such an implementation will be appreciated that the "set" state of the tracking field will indicate not only that a capability with the specified marker value has been written to the associated memory region, but will also give an indication of the number of capabilities having the specified marker value that have been written to that memory region. In some implementations, the tracking structure may be arranged to monitor multiple different marker values, and implement a different saturating counter for each marker value being monitored.

By using a tracking structure as discussed above, it is possible to keep track of the memory region or memory regions to which capabilities having a specified marker value are written. Also, it is not necessary to track the writing of all capabilities to memory, since only capabilities with a particular associated marker value need to be tracked, and other capabilities can be written to memory without being tracked. By tracking the writing to memory of capabilities of interest in this manner, this can significantly improve the efficiency with which such capabilities can later be revoked, if necessary.

For instance, in one example implementation, the processing circuitry may be arranged, responsive to a revocation trigger, to implement in respect of each memory region whose tracking field in the tracking structure is set, a revocation process to identify each stored capability within that memory region whose associated marker indication field has the specified marker value and, for each identified stored capability, to revoke that identified stored capability provided a revocation condition is met for that identified stored capability. For any memory region monitored by the tracking structure whose associated tracking field is not set, hence indicating that there are no relevant capabilities stored in that memory region, then that memory region can be skipped during the revocation process, thereby providing increased performance when searching for revocation candidate capabilities.

The revocation trigger could take a variety of forms, but in one example implementation may be an indication that one or more previously allocated blocks of memory have now been deallocated, at which point it would be desirable to seek to identify any dynamic capabilities that would allow access to such a deallocated block of memory.

For each memory region whose tracking field in the tracking structure is set, indicating that at least one capability with the specified marker value has been written to that memory region, then each such capability can be identified, and if the revocation condition is met for that identified capability, that identified capability can be revoked.

The way in which it is determined whether the revocation condition is met may vary dependent on implementation. However, in one example implementation, for each capability the constraining information comprises at least range constraining information indicating an allowable range of memory addresses accessible using the pointer value, and for a given identified stored capability the revocation condition is determined to be met when the allowable range of memory addresses includes one or more memory addresses within a block of memory that has been deallocated.

There are several strategies that could be adopted to assess whether the revocation condition is met. For example, it may be chosen to revoke a given capability when only part of the range of memory addresses accessible using that capability is within the block of memory identified for revocation. However, conversely, an alternative strategy might be to revoke only capabilities whose allowable range of memory addresses is fully included within the block of memory that is identified for revocation. Indeed, in some implementations it may be chosen to only perform a "fast" check of this, and hence only check whether the base bound, current address, or top bound (or any combination thereof) are included within the block of memory being deallocated.

There are various different ways in which the marker indication field may be stored in association with each capability. For example, in one implementation the marker indication field may be viewed as being part of the capability, and stored in memory along with the capability. However, in an alternative implementation the marker indication fields may be stored in a separate area of memory accessible independently of a memory address space storing the associated capabilities. When the marker indication fields are stored in this way, then this can provide some performance improvements when performing the above-mentioned revocation process. For example, the processing circuitry may be arranged, for a given memory region whose tracking field in the tracking structure is set, to obtain from the separate area of memory the marker indication fields associated with each capability stored within that given memory region. Then, for each obtained marker indication field whose marker value is the specified marker value, the processing circuitry may be arranged to read the associated capability from the given memory region and determine whether the revocation condition is met for that associated capability. Hence, by such an approach it can be seen that the revocation process can be implemented as a two-stage process, with the marker indication fields being obtained first, such that only the capabilities whose associated marker indication field has the specified marker value then need to be read from the memory region and evaluated to determine whether the revocation condition is met.

In one example implementation, the separate area of memory may be further arranged to store a valid capability indication field associated with each capability sized block of data in memory, where each valid capability indication field is used to identify whether the associated capability sized block of data in memory stores a valid capability. The processing circuitry may then be arranged, for the given memory region whose tracking field in the tracking structure is set, to identify each valid capability that has the specified marker value in dependence on the valid capability indication fields and the marker indication fields stored in the separate area of memory. Whilst in one such example implementation both the values of the valid capability indication fields and the marker indication fields associated with each capability that is stored within the given memory region are retrieved from the separate area of memory, so that the values in those fields can then be assessed to determine which capabilities need to be reviewed, in an alternative implementation the separate area of memory may be arranged to return a combined condition indicating only the instances where both the valid capability indication field indicates that the associated capability is valid and the marker indication field indicates that the associated capability has the specified marker value associated with it, so that the information returned from the separate area of memory directly indicates the capabilities that need to be evaluated for presence of the revocation condition.

In one example implementation, the apparatus further comprises memory handling circuitry to allocate one or more blocks of memory for use by the processing circuitry and to subsequently deallocate a previously allocated block of memory when the processing circuitry no longer requires access to that previously allocated block of memory. The memory handling circuitry can be implemented in a variety of ways, and hence for example could be implemented by dedicated hardware, or could be implemented by software executing on the processing circuitry. In response to the memory handling circuitry allocating a given block of memory for use by the processing circuitry, the processing circuitry may be arranged to be provided with one or more capabilities for use by the processing circuitry when accessing the given block of memory. The provided capabilities may be pre-existing capabilities, or could for example be capabilities derived from pre-existing capabilities (as mentioned earlier such derived capabilities will typically be restricted so that the constraining information is at least as limited as the constraining information provided by the capability from which the derived capability is produced).

In one example implementation, each marker indication field is constrained such that, once the marker value has been stored in that marker indication field, the marker value within the marker indication field is prohibited from being modified unless the associated capability is invalidated. Hence, whilst in some implementations the initial marker value stored in the marker indication field may be set by software, once it has been set it cannot be altered. In one example implementation, any attempt to modify the marker value in the marker indication field will result in the associated capability being invalidated, so that it can no longer be used as a capability. If desired, in an alternative implementation the above prohibition on modifying the marker value may be associated with a marker indication field whose value has been set to indicate that writing of the associated capability to memory is to be tracked, so that it is not possible to subsequently identify that the capability should not be tracked without invalidating the capability. However, in such an implementation it may be possible to modify the marker value of a marker indication field indicating that the associated capability is not to be tracked to a marker value that indicates that the associated capability should be tracked.

In one example implementation, each marker indication field is constrained such that, once the marker value has been stored in that marker indication field, any attempt to modify the marker indication field causes a fault signal to be asserted. This enables the fact that an attempt to modify the marker indication field has taken place to be flagged, so as to allow any desired further action to be taken.

As mentioned earlier, if desired, then in one example implementation the processing circuitry may be enabled, at least in one mode of operation, to perform a capability generation operation to derive a new capability from an existing capability, and in that event may be constrained when deriving the new capability to ensure that the new capability inherits the marker value associated with the existing capability. The ability to perform such a capability derivation process could be allowed in all modes of operation of the processing circuitry, or alternatively could be restricted to particular modes, for example a mode in which privileged or trusted software is being executed.

In one example implementation, the specified marker value is used solely to control tracking of the writing of certain capabilities to memory, in the manner discussed earlier. However, in an alternative implementation, the specified marker value can also be used for additional purposes. For instance, in one example implementation the capability tracking circuitry may be arranged to prevent a capability having the specified marker value from being written to a memory address within one or more restricted memory regions. This can be useful in a variety of situations. For example, it may be the case that certain forms of capability, for example the earlier-mentioned dynamic capabilities, would only legitimately be written to defined areas of memory, and any attempt to write them to other areas of memory outside of those defined areas of memory would represent suspect behaviour. By associating the specified marker value with the capabilities of interest, then the capability tracking circuitry can also police such activities, and prevent such a write taking place if the write is being attempted to one or more restricted memory regions (i.e. a memory region other than one of the defined areas to which it is expected such capabilities to be written). There are various ways in which such a write operation could be prevented. For example, the capability tracking circuitry could block the memory access taking place (if desired, such behaviour could be associated not only with a write access but also a read access), could raise some form of memory fault if an attempt is made to write such a capability to a restricted memory region, or alternatively in some instances may allow the access to take place, but then clear the valid capability indication field to identify that the capability is invalid.

As regards to memory regions that may be considered to be restricted memory regions, and purely by way of specific example, such an approach can be used to allow capabilities having the specified marker value to be written to stack regions of memory (but with the tracking field within the tracking structure being set in the manner discussed earlier), whilst preventing capabilities having the specified marker value from being written to one or more other areas of memory, for example a temporary data buffer, a scratchpad, or peripheral memory.

In one example implementation, the marker indication field is a single bit value, the specified marker value being a first value settable within the marker indication field, and a second value settable within the marker indication field being used to identify that storing of the associated capability to memory is not to be tracked by the capability tracking circuitry. This can provide a simple implementation where the storage requirements for the marker indication field is minimised. Further, such an approach enables a distinction to be made between dynamic capabilities that are provided for use in association with memory regions that can be dynamically allocated and deallocated, and static capabilities that are permanently available to the processing circuitry, for example capabilities that may be provided by the compiler.

However, if desired, the marker indication field may instead be a multi-bit field, and the marker value used to indicate that a given capability is to be tracked may be selected dependent on an allocation condition present at the time the given capability is provided for use by the processing circuitry. This can provide additional enhancement and flexibility in the use of the marker indication field, for example enabling a distinction to be made between different forms of dynamic capability.

For example, the allocation condition may be arranged to depend on a current generation of memory allocation for which capabilities are being allocated, where the memory handling circuitry is arranged to allocate one or more blocks of memory for use by the processing circuitry in a series of generations of memory allocations. In such an arrangement, different marker values can be associated with different generations of memory allocations, allowing for example the writing of dynamic capabilities to be tracked separately dependent on the generation of memory allocation with which those capabilities are associated. Such an approach then facilitates generational revocation of capabilities, where the above described revocation process can be restricted to dynamic capabilities associated with a particular generation of memory allocation and subsequent deallocation.

As another example, the allocation condition may be arranged to depend on a thread of execution of the processing circuitry for which capabilities are being allocated, and hence different marker values can be associated with different threads of execution, allowing the writing of such capabilities to be tracked separately for different threads if desired.

As a yet further example, the allocation condition may be arranged to depend on an allocation identifier associated with a capability allocation process, where the capability allocation process is arranged to implement a plurality of capability allocator instances and the allocation identifier indicates a current capability allocator instance. This would hence for example allow, in due course, the revocation process to be performed in relation to capabilities that had been allocated by a particular capability allocator instance.

In one example implementation, the capability tracking circuitry may comprise a plurality of capability trackers, where each capability tracker has at least one associated marker value. Each capability tracker could then be arranged to maintain a separate tracking structure providing a tracking field for each of a plurality of memory regions, and may be arranged to set the tracking field for a given memory region amongst the plurality of memory regions when at least one capability whose associated marker indication field has the at least one associated marker value is written to the given memory region. Such an approach provides a great deal of flexibility in how capabilities are tracked for subsequent revocation. For example, several separate capability trackers could be provided, which each could be tracking the same memory, but with different marker values. As another example, there may be several capability trackers, with different memories associated with each. As a yet further example, there may be several capability trackers, each of which are tracking different memories, and using a multitude of marker values.

There are a variety of ways in which the marker indication field may be implemented in situations where the marker indication field is a multi-bit field. In one example implementation, the marker indication field may be formed by a single bit marker indication sub-field and a pre-existing field of the associated capability, and the marker value provided by the marker indication field may be determined from a combination of the value of the single bit marker indication sub-field and a value of the pre-existing field. The pre-existing field could take a variety of forms, and in one example implementation may be an object type field provided for each capability to indicate a type of the associated capability. By way of specific example, the object type field may traditionally be used to identify whether the associated capability is a normal capability or a sealed capability. A number of capability architectures have introduced the concept of a sealed capability. By sealing a capability, this allows that capability to be marked as non-dereferenceable (meaning that memory addresses cannot be accessed using the capability) and immutable, causing hardware exceptions to be raised if attempts are made to modify or dereference such a capability. In the above example implementation, the information in the object type field can be reused, in combination with the single bit marker indication sub-field, to provide the marker value. This would hence, for example, allow the marker value to be varied dependent on the type of capability indicated by the object type field.

There are various ways in which capabilities may be provided for use by the processing circuitry when accessing particular allocated blocks of memory. In one example implementation, the processing circuitry may be arranged to execute a capability determining instruction to determine a capability for use by the processing circuitry, where execution of the capability determining instruction causes the marker value of the determined capability to be derived from a control value in a system control register of the apparatus. Execution of the capability determining instruction may cause a new capability to be generated (in one example this can conceptually be seen as deriving the capability from an implicit maximum permission capability), or may cause a capability to be derived from an existing capability. In accordance with the above-mentioned example implementation, the marker value associated with the capability determined as a result of executing the capability determining instruction is set in dependence on a control value held within a system control register. That control value may be a single bit value, which as noted earlier allows distinction to be made between static capabilities and dynamic capabilities, or may be a multi-bit value, allowing additional information to be captured within the marker value. Such an approach could allow, for example, the marker value to be set in dependence on a thread identifier, or the current address space identifier (ASID) value being used by the processing circuitry. It should be noted that the control value within the system control register could be used directly to form the marker value, or instead the marker value could be derived from the control value, for example by performing a predetermined computation using the control value in order to determine the marker value.

In one example implementation, in addition to using the control value in the system control register to derive the marker value for the determined capability, that control value may also be used to control the specified marker value that the capability tracking circuitry is looking for when reviewing capabilities being written to memory. This hence enables both the marker values set in association with capabilities at the time those capabilities are provided for use by the processing circuitry, and the marker value(s) that the capability tracking circuitry is monitoring for, to be set in dependence on a control value in a system control register.

If desired, the marker values can also be used to limit the capabilities that can be accessed, at least in respect of one or more defined areas of memory. For instance, in one example implementation the capability tracking circuitry may be arranged, for at least one or more defined areas of memory, to only permit memory accesses of at least one type to be performed in respect of valid capabilities whose marker value matches one or more predefined values. Hence, if the marker value of the capability that the processing circuitry is seeking to access does match one or more predefined values, then the capability tracking circuitry can be arranged to allow the access to proceed, and if that access is a write access then the above-mentioned techniques for setting the tracking field in instances where the capability has the specified marker value may be employed. However, if the marker value does not match one or more predefined values, then the capability tracking circuitry can be arranged to prevent that access taking place. Such a mechanism for preventing access can be applied in respect of write accesses, read accesses, or both.

The one or more predefined values can take a variety of forms. For example, such predefined values could for example be an all zeros value (which could for instance be used in association with static capabilities that are not to be tracked) or one or more other specific non-zero values that the processing circuitry is currently allowed to use. By such an approach, old/stale capabilities can be prevented from being accessed, thus enhancing the generational revocation approach discussed earlier. Alternatively, such a scheme could for example be used to prevent accessing capabilities associated with a different thread to the one currently being executed by the processing circuitry. The manner in which the access is prevented may vary dependent on implementation. For example, a fault could be raised to enable software to handle the situation, or the capability could be invalidated (for example by allowing the access to the capability to proceed but clearing the valid capability indication field for the capability).

The above approach of selectively preventing access to capabilities whose marker values do not match one or more predefined values can be applied generally, or its application could be limited to one or more defined areas of memory. Hence, by way of example, this functionality could be limited to specific memory management unit (MMU) or memory protection unit (MPU) regions of memory.

In one particular example implementation, the capability tracking circuitry may be arranged to prevent a valid capability being loaded from memory unless that capability has an associated marker value that matches the one or more predefined values. This hence enables stale capabilities to be prevented from being loaded, or any attempt to load such a stale capability could for example cause the capability as loaded to be invalidated.

In one example implementation, the capability tracking circuitry could be permanently enabled, but if desired the apparatus may further comprise an enable flag storage whose value is settable to selectively enable and disable the capability tracking circuitry. The ability to enable and disable the functionality of the capability tracking circuitry can provide additional flexibility in the operation of the apparatus. For example, in instances when no dynamic memory allocation is taking place, and hence any capabilities being used are static capabilities, the capability tracking circuitry can be disabled.

In one example implementation, the capability tracking circuitry may be arranged to clear the tracking field for a given memory region upon invalidation of all capabilities written to the given memory region whose associated marker indication field had the specified marker value. Hence, once the earlier mentioned revocation process has been performed in respect of a given memory region, and accordingly any capabilities that had caused the associated tracking field to be set have been invalidated, then the tracking field can be cleared. In an implementation where the earlier-mentioned saturating counter approach is used for the tracking field, then the value of the saturating counter in the tracking field can be decremented after invalidation of each capability that had previously caused the saturating counter to be incremented.

Particular example implementations will now be discussed with reference to the figures.

FIG. 1 schematically illustrates an example of a data processing apparatus 2 in accordance with one example implementation. It will be appreciated that this is a simplified diagram for ease of explanation, and in practice the apparatus may have many elements not shown in FIG. 1 for conciseness. The apparatus 2 comprises processing circuitry 4 for carrying out data processing in response to instructions decoded by an instruction decoder 6. Program instructions are fetched from a memory system 8 and decoded by the instruction decoder to generate control signals which control the processing circuitry 4 to process the instructions in the way defined by the architecture. For example, the decoder 6 may interpret the opcodes of the decoded instructions and any additional control fields of the instructions to generate control signals which cause the processing circuitry 4 to activate appropriate hardware units to perform operations such as arithmetic operations, load/store operations or logical operations. The apparatus has a set of scalar registers 10 and a set of capability registers 12. Whilst the capability registers 12 are shown as distinct from the scalar registers 10, in one example implementation the capability registers may at least partially reuse some of the scalar registers (for example by storing the pointer values of the capabilities within the scalar registers). The apparatus may also have other registers, for example a system control register or registers 28 for storing control information used to configure the operation of the processing circuitry, and/or vector registers (not shown) for providing vector operands in implementations where the processing circuitry can be configured to perform vector processing operations.

In response to arithmetic or logical instructions, the processing circuitry typically reads source operands from the registers 10 and writes results of the instructions back to the registers 10. In response to load/store instructions, data values are transferred between the registers 10 and the memory system 8 via a load/store unit 18 within the processing circuitry 4. Capabilities can also be loaded from memory into the capability registers 12, or stored from the capability registers 12 back to memory 8 via the load/store unit 18. The memory system 8 may include one or more levels of cache as well as main memory.

The processing circuitry 4 may include a number of distinct hardware blocks for processing different classes of instructions. For example, load/store instructions which interact with the memory system 8 may be processed by a dedicated load/store unit 18, whilst arithmetic or logical instructions could be processed by an arithmetic logic unit (ALU). The ALU itself may be further partitioned into a multiply-accumulate unit (MAC) for performing operations involving multiplication, and a further unit for processing other kinds of ALU operations. A floating-point unit can also be provided for handling floating-point instructions.

As shown in FIG. 1, the processing circuitry 4 may include memory handling circuitry 22 that is used to allocate one or more blocks of memory for use by the processing circuitry, and which can be used to subsequently deallocate a previously allocated block of memory when the processing circuitry no longer requires access to the previously allocated block of memory. The memory handling circuitry could be implemented by dedicated hardware, or could be implemented by software executing on the processing circuitry 4 (for example software performing malloc( ) and free( ) operations).

The processing circuitry 4 may also be arranged to execute processes 20 in order to allocate capabilities for use by the processing circuitry, and to also perform revocation processes to seek to revoke capabilities that are no longer required. As discussed earlier, the capabilities used by the apparatus may be both static capabilities used to access statically allocated memory and dynamic capabilities used to access dynamically allocated memory. Both types of capabilities could in principle be allocated by the capability allocation processes 20 running on the processing circuitry 4, but in one example implementation the static capabilities may be allocated in the program code as literal pools by the compiler, and hence it may only be the dynamic capabilities that are provided for use by the processing circuitry 4 using the capability allocation processes 20, and it will hence in such a scenario only be those dynamic capabilities that later need to be revoked when they are no longer needed.

As discussed earlier, capabilities can be used when generating memory addresses for access requests to memory, rather than using standard pointer values, where each capability is arranged to indicate a pointer value and constraining information used to constrain access to memory using memory addresses derived from the pointer value. The apparatus 2 may be provided with capability access checking circuitry 16 that can perform a capability check operation in association with an access request whose memory address is generated using a specified capability, in order to determine whether that access request is permitted based on the constraining information identified by the capability. This can for example be performed with reference to the range information and restriction/permission information forming the constraining information of the capability. Hence, purely by way of example, if a write access request to a memory address is seeking to be performed using a capability that indicates that the capability can only be used for reads but not writes, then the capability checking circuitry 16 may determine that the access request cannot proceed, and may for example issue a fault signal under such circumstances.

As will be discussed in more detail herein, capability tracking circuitry 24 may be provided to monitor the writing of capabilities to the memory system 8 and optionally also the reading of capabilities from the memory system 8, and to maintain a tracking structure 26 that can later be used to improve the efficiency of the revocation processes 20 performed by the processing circuitry 4. In accordance with the techniques described herein, a marker indication field may be stored in association with each capability to provide a marker value used to distinguish between static capabilities used to access statically allocated memory and dynamic capabilities used to access dynamically allocated memory, and the capability tracking circuitry 24 may be arranged to monitor the marker value of each capability written to memory, so as to keep track of capabilities written to memory that have one or more particular marker values.

The capability tracking circuitry 24 is arranged to maintain a tracking structure 26 providing a tracking field for each of a plurality of memory regions (as mentioned earlier the size of the memory regions for which the tracking structure provides a tracking field may be varied dependent on implementation). The capability tracking circuitry is arranged to set the tracking field for a given memory region amongst the plurality of memory regions when at least one capability whose associated marker indication field has a specified marker value is written to the given memory region, where the specified marker value indicates that writing of the associated capability to memory is to be tracked by the capability tracking circuitry to facilitate subsequent revocation of that associated capability. The specified marker value may, for example, indicate that the associated capability is a dynamic capability, and in implementations where the marker value can be a multi-bit value to distinguish between different forms of dynamic capability, the capability tracking circuitry could for example be set up to only track dynamic capabilities of a particular form if desired.

The tracking field can take a variety of forms, and hence in one example implementation may be a single bit field that is set when a capability having the specified marker value is written to the memory region associated with that tracking field. However, in an alternative implementation the tracking field may be a multi-bit field, to allow more detailed information to be captured. For example, as discussed earlier the tracking field may take the form of a saturating counter.

Figure 2:
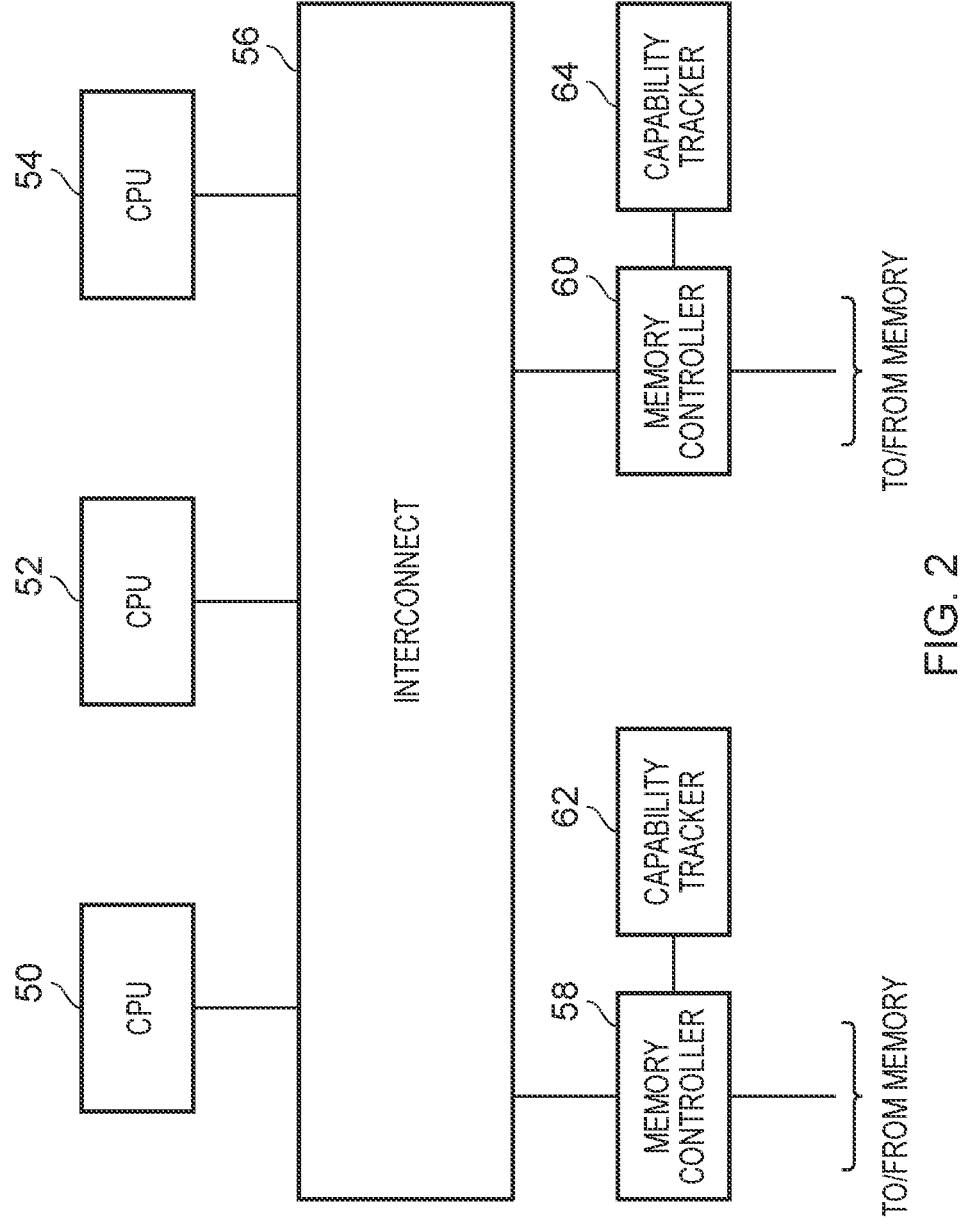
FIG. 2 is a block diagram of an apparatus in accordance with one example implementation.

The capability tracking circuitry 24 may in one example implementation be shared with multiple processing circuits (only one of which is shown in FIG. 1), and in addition different tracking circuits may be associated with different memory controllers, as illustrated schematically by way of example in FIG. 2. In particular, as shown in FIG. 2, a plurality of processing circuits 50, 52, 54 in the form of central processing units (CPUs) are connected via an interconnect 56 to memory controllers 58 and 60, each of which control access to associated memory. A separate capability tracker 62, 64 may be provided in association with each memory controller 58, 60 in accordance with this example implementation.

Also, whilst in FIG. 1 the tracking structure 26 as shown as provided internally to the capability tracking circuitry 24, it could in an alternative implementation be a dedicated hardware storage unit, or be provided by a data structure within the memory system 8.

Figure 3A:
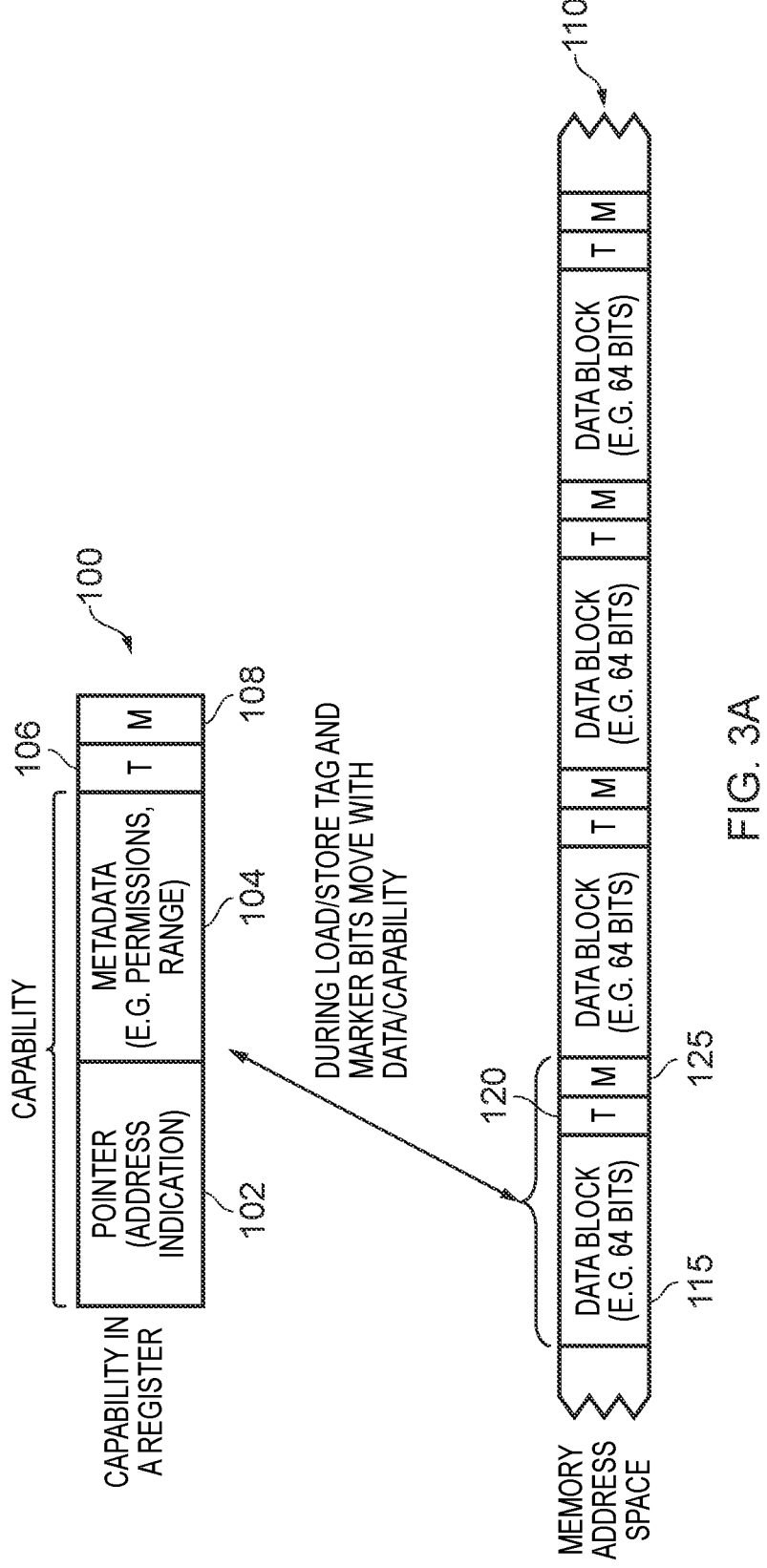
FIGS. 3A and 3B illustrate different ways in which valid capability indications (which in one example take the form of tag bits) and marker indications may be stored in association with capabilities, in accordance with some example implementations.

FIG. 3A schematically illustrates how a tag bit T (an example of a valid capability indication field) may be used in association with individual data blocks to identify whether those data blocks represent a capability, or represent normal data, and how a marker indication field M may also be used in association with individual data blocks to provide a marker value used to distinguish between a static capability and a dynamic capability in instances where the tag bit indicates that the data block represents a valid capability. In particular, the memory address space 110 will store a series of data blocks 115, which typically will have a specified size. Purely for the sake of illustration, it is assumed in this example that each data block comprises 64 bits, but in other example implementations different sized data blocks may be used, for example 128-bit data blocks when capabilities are defined by 128 bits of information. In association with each data block 115, there is provided a tag field 120, which in one example is a single bit field referred to as the tag bit, which is set to identify that the associated data block represents a capability, and is cleared to indicate that the associated data block represents normal data, and hence cannot be treated as a capability. It will be appreciated that the actual value associated with the set or the clear state can vary dependent on implementation, but purely by way of illustration, in one example implementation if the tag bit has a value of 1 it indicates that the associated data block is a capability, and if it has a value of 0 it indicates that the associated data block contains normal data.

As also shown in FIG. 3A, in association with each data block 115 there is also provided a marker indication field 125 to store a marker value used to identify whether the associated capability is a static capability or a dynamic capability. As mentioned earlier, a single bit marker indication field can be used in one example implementation, but in an alternative implementation a multi-bit marker indication field may be used, for example to distinguish between different forms of dynamic capability.

When a capability is loaded into a register 100 accessible to the processing circuitry (for example one of the capability registers 12 illustrated in FIG. 1), then the tag bit moves with the capability information. Accordingly, when a valid capability is loaded into the register 100, an address indication 102 (which may also be referred to herein as a pointer) and metadata 104 providing the constraining information (such as the earlier-mentioned range information and permissions information) will be loaded into the register. In some implementations, additional metadata may also be provided. In addition, in association with that register, or as specific fields within it, the tag bit 106 will be set to identify that the contents represent a valid capability, and the marker indication field 108 will be provided to distinguish between a static capability and a dynamic capability (by copying the marker value from the relevant marker indication field 125 in memory). Similarly, when a valid capability is stored back out to memory, the relevant tag bit 120 will be set in association with the data block in which the capability is stored, and the marker value in the marker indication field 108 of the register will be copied into the marker indication field 125 in memory. By such an approach, it is possible to distinguish between a capability and normal data, and hence ensure that normal data cannot be used as a capability, and for valid capabilities the marker indication field can be used to provide information about the capability that can be used to track that capability for later revocation.

Figure 3B:
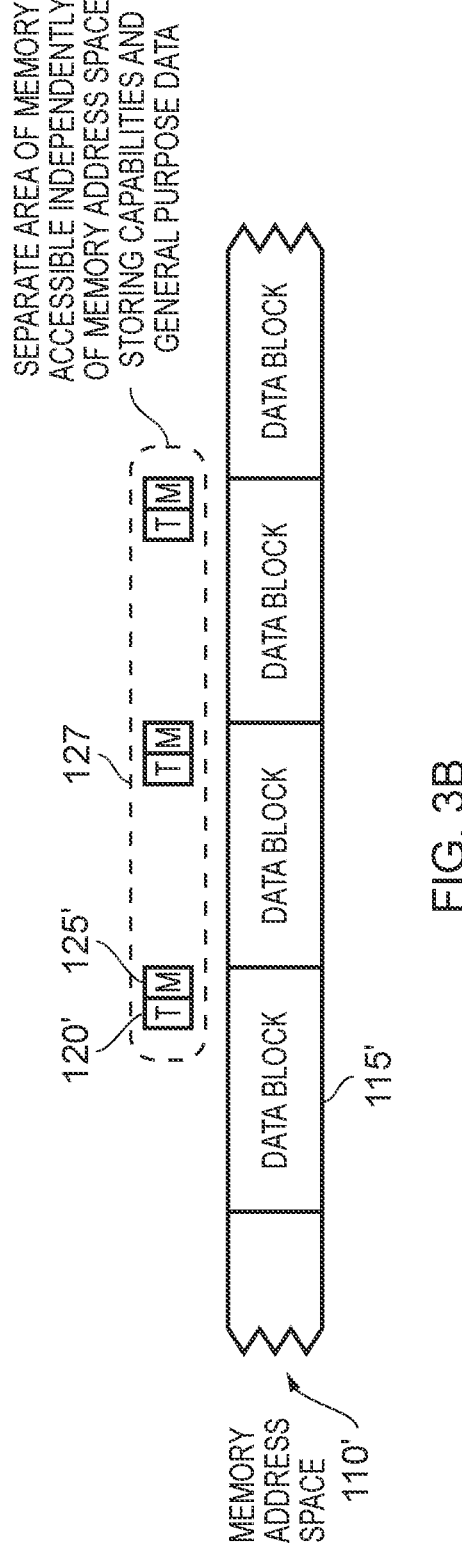

Whilst in the example shown in FIG. 3A, the tag bits and marker values are stored within the normal memory address space 110, this is not a requirement, and in an alternative example implementation, as illustrated in FIG. 3B, the tag bits may instead be stored "out-of-band", for example in a distinct area of memory. Hence, whilst each data block 115' is stored within the normal memory address space 110', the tag fields 120' and marker indication fields 125' are stored within a separate area of memory 127 that is accessible independently of the memory address space 110' storing capabilities and general purpose data. As will be discussed in more detail later with reference to the flow diagram of FIG. 7, such an arrangement can enable an improvement in efficiency and performance when performing revocation processes in respect of capabilities.

Figure 4:
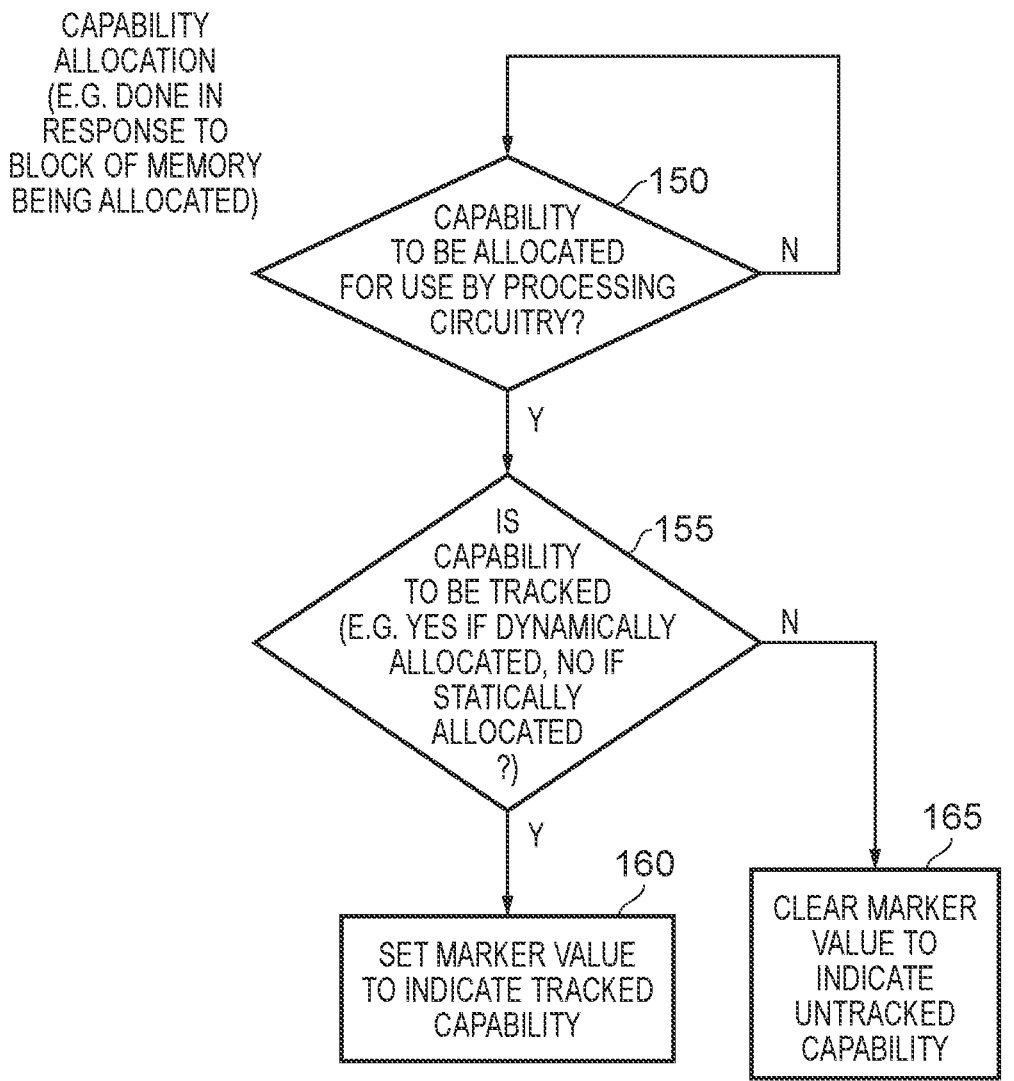
FIG. 4 is a flow diagram illustrating a capability allocation process in accordance with one example implementation.

FIG. 4 is a flow diagram illustrating a capability allocation process that may be performed in accordance with one example implementation, using the capability allocation processes 20 illustrated schematically in FIG. 1. Such a capability allocation process can be performed for a variety of reasons, but could for example be performed in response to a block of memory being allocated to the processing circuitry 4 by the memory handling circuitry 22, at which point the allocation process may be used to provide one or more capabilities for use by the processing circuitry when accessing that block of memory. There are a number of ways in which a capability may be allocated using the process of FIG. 4. As one example, a set of root capabilities may be provided in memory, and other capabilities may then be derived from those root capabilities using the process of FIG. 4.

At step 150, it is determined whether a capability is to be allocated for use by the processing circuitry, and if so the process proceeds to step 155, where it is determined whether the capability is to be tracked for later revocation or not. In one example implementation, this may be the case if the capability is being provided in association with dynamically allocated memory, but will not be the case if the capability is being provided in association with statically allocated memory. It is also possible in some implementations that it may be considered appropriate to track certain dynamic capabilities but not others. If it is decided that the capability is not to be tracked, then at step 165 the marker value is cleared in association with the allocated capability to indicate that the capability is an untracked capability. However, if the capability is to be tracked, then the marker value is set at step 160 to indicate that the capability is a tracked capability. In situations where the marker value is a single bit value, then the set and clear states can be indicated by logic one and zero values (with the logic one value indicating either the set state or the clear state, and the logic zero value indicating the other state). However, if multi-bit marker values are used, there may be a number of different marker values that can each indicate a capability to be tracked, and an appropriate one of those marker values will be chosen at step 160.

Whilst the process of FIG. 4 may in principle be performed for both static and dynamic capabilities, in one example implementation it may be the case that the static capabilities are already allocated in the program code as literal pools by the compiler, and hence the process of FIG. 4 may in such implementations not be performed in respect of static capabilities, and it will only be dynamic capabilities that are allocated by the process shown in FIG. 4.

Figure 5A:
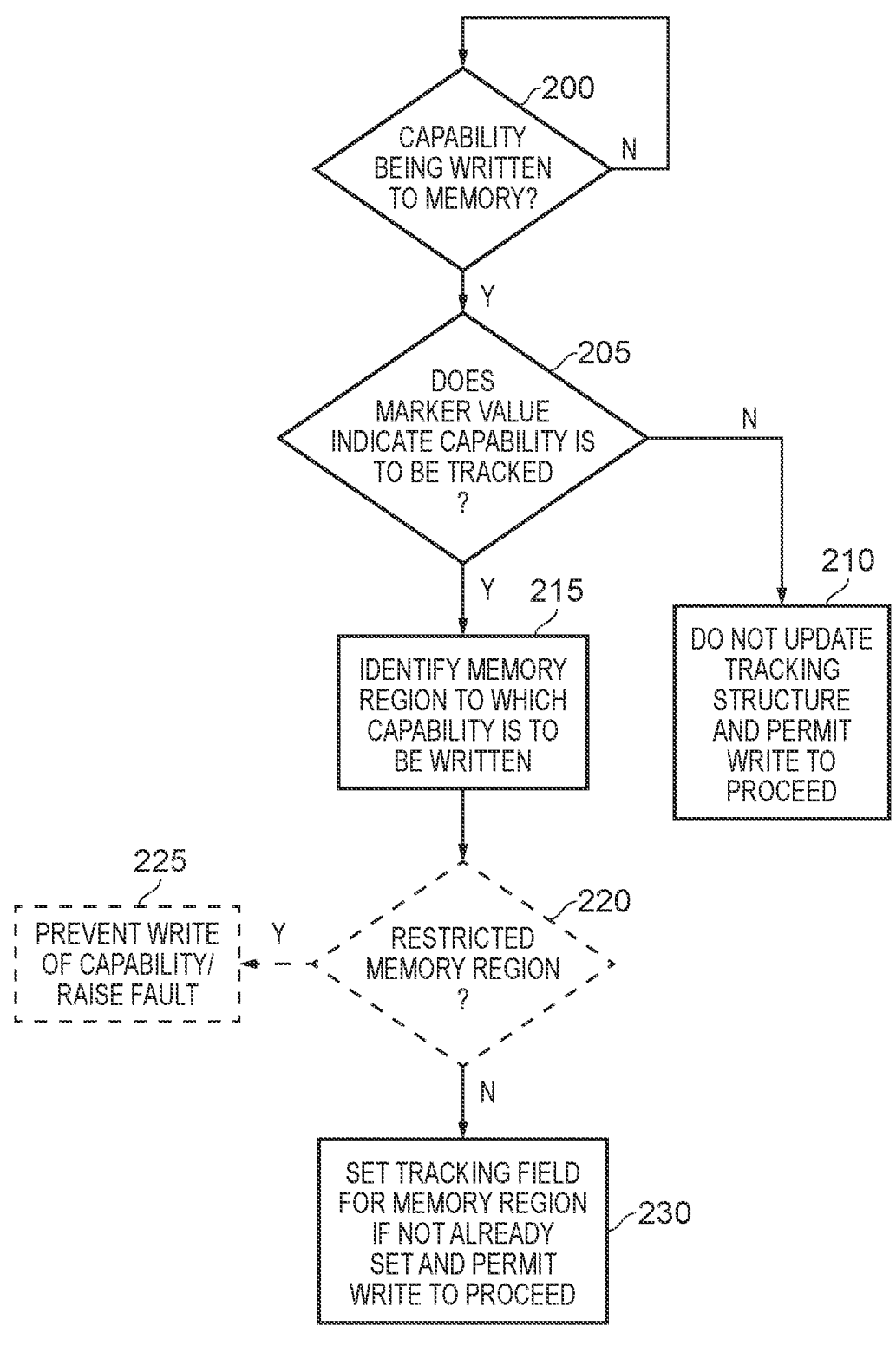
FIG. 5A is a flow diagram illustrating steps taken when it is determined that a capability is be written to memory, in accordance with one example implementation.

FIG. 5A is a flow diagram illustrating a sequence of steps that may be performed when it is determined that a capability is being written to memory, in accordance with one example implementation. At step 200, once it is determined that a capability is being written to memory, it is then determined at step 205 whether the marker value associated with that capability indicates that the capability is to be tracked. If not, then the process can proceed to step 210, where the tracking structure 26 maintained by the capability tracking circuitry 24 is not updated, and the write operation is permitted to proceed, subject to any conditions controlling the ability to perform the write operation being met.

However, if at step 205 it is determined that the marker value indicates that the capability is to be tracked, then at step 215 the memory region to which the capability is to be written is identified from the memory address specified by the write access request. Whilst in the example shown in FIG. 5A step 205 and step 215 are shown as separate steps, in an alternative implementation they may be implemented as a single step. In particular whether a write of a given capability is to be tracked may depend on the configuration of the tracker associated with the memory region that given capability is being written to, and hence there may be a circular dependency between step 205 and step 215.

In one example implementation, the process can then proceed directly to step 230, where the write operation is permitted to proceed, subject to any other conditions controlling the ability to perform the write operation being met, and assuming the write operation is performed the tracking field for that memory region is set if it has not already been set due to a previous write of a tracked capability to that memory region.

In the above example, it is assumed that the tracking field is a single bit field that is merely set or cleared. However, as mentioned earlier, it is possible in an alternative implementation for the tracking field to take a multi-bit form, so as to allow more information to be captured within the tracking field. For instance, in one example, as mentioned earlier, the tracking field may be a saturating counter, and in that event, at step 230, the value of the saturating counter will be incremented.

In another alternative implementation, in addition to setting the tracking field at step 230, the tracking structure 26 within the capability tracking circuitry 24 may be extended so as to enable the addresses of the tracked capabilities that have been written to the memory region (i.e those that had the marker value indicating that those capabilities should be tracked) to be stored within the tracking structure so as to provide a dense list of relevant addresses that can later be queried. Whilst this increases the size of the tracking structure, it may enable the performance of the subsequent revocation process to be further improved.

As indicated by dotted boxes 220 and 225, the process of FIG. 5A may optionally include some additional steps. In particular, in accordance with such an alternative implementation, the marker values may also be used to restrict access to certain memory regions, and in particular one or more restricted memory regions to which tracked capabilities should not be written can be specified. Accordingly, once at step 215 the memory region to which the capability is to be written is determined, then at step 220 it can be determined whether the memory region is a restricted memory region. If not, then the process can proceed to step 230 as discussed earlier, but if the memory region is a restricted memory region, then instead the process can proceed to step 225, where the writing of the capability is prevented. There are various ways in which the write operation could be prevented. For example, the capability tracking circuitry 220 could block the memory access taking place, could raise some form of memory fault, or could alternatively allow the write operation to take place but clear the tag bit to invalidate that capability.

One or more restricted memory regions could be established, for example regions of memory where it is not expected that dynamic capabilities should legitimately be written. Purely by way of example, such restricted memory regions could be a temporary data buffer, a scratchpad, or peripheral memory.

Figure 5B:
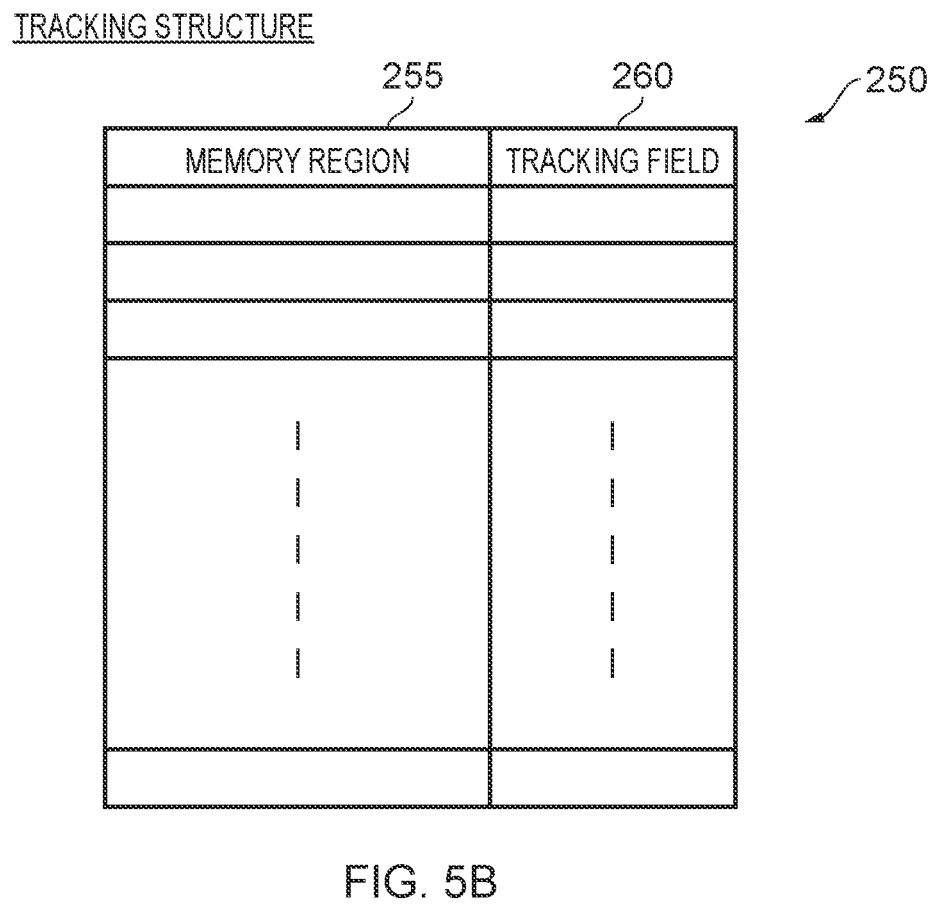

FIG. 5B schematically illustrates the tracking structure 250 in accordance with one example implementation. The tracking structure may comprise a plurality of entries, and each entry may have a first field 255 to identify a memory region and a second field 260 to form the earlier-mentioned tracking field. The size of the memory regions for which the tracking structure provides a tracking field may be varied dependent on implementation, thus allowing the capability tracking circuitry to track at either a coarse-grained or fine-grained level, or indeed for a mixture of different sized memory regions.

FIG. 6 is a flow diagram illustrating steps that may be performed to selectively revoke capabilities upon occurrence of a revocation trigger. At step 300, it is determined whether a revocation trigger has been detected. The revocation trigger can take a variety of forms, but in one example implementation could occur once one or more previously allocated blocks of memory have been deallocated, hence indicating that any dynamic capabilities that have been allocated for use by the processing circuitry to access those now deallocated blocks of memory are candidates for being revoked.

Having to sweep an entire memory system to locate capabilities that might need to be revoked is a very resource-intensive process. However, through use of the capability tracking circuitry 24 described herein, and in particular by using the tracking structure 26 maintained by that capability tracking circuitry, it is possible to perform a much more targeted process when seeking to identify the capabilities that might need to be revoked.

In particular, once the revocation trigger is detected at step 300, at step 305 the capability tracking circuitry 24 can be consulted to determine each memory region whose tracking field has been set (i.e. where the tracking field has a value indicating that one or more capabilities whose marker indication field indicates that those capabilities should be tracked has been written to that memory region). As mentioned earlier, in some systems there may be multiple capability tracking circuits, and which capability tracking circuit is consulted at this point may depend on a number of factors, for instance which parts of memory each capability tracking circuit is associated with (in an example implementation where different capability tracking circuits are associated with different parts of memory), which marker values are being tracked by the various capability tracking circuits (for example in a generational memory allocation implementation where different capability tracking circuits track capabilities associated with different generations of memory allocation, in which case the capability tracking circuit or circuits that is/are tracking capabilities associated with the generation of memory allocation associated with the block of memory being deallocated can be referred to), etc.

Once at step 305 each memory region has been identified whose tracking field is set, then for each identified memory region, at step 310 that memory region can be scanned to locate each stored capability whose marker value indicates that capability is a candidate for revocation, i.e. whose marker value indicates that it is being tracked for revocation. In implementations where a multi-bit marker value is being used, then at this point the memory may be being scanned to identify capabilities that have one or more specific marker values of interest, i.e. marker values that indicate that the associated capability is a candidate for revocation in response to the current revocation trigger.

In an implementation where the tracking structure is extended to enable the addresses of the relevant capabilities to be captured directly within the tracking structure, then the performance of the scanning process of step 310 can be improved, since the addresses stored within the tracking structure can be used to retrieve each capability that is a candidate for revocation.

Once each stored capability whose marker value indicates that capability is a candidate for revocation has been located, it can then be determined for each located capability if the revocation condition is met. There are various ways in which the revocation condition could be assessed. In one example implementation, if the range constraining information associated with the given capability at least partially falls within the block of memory that has been deallocated, then it may be determined that the revocation condition has been met for that given capability. However, an alternative strategy might be to revoke only capabilities whose allowable range of memory addresses is fully included within the block of memory that is identified for revocation.

Finally, at step 315 each capability for which the revocation condition has been determined to be met can be revoked, for example by clearing the tag bit associated with that capability.

FIG. 7 is a flow diagram illustrating a sequence of steps that can be performed to implement step 310 of FIG. 6, in an implementation where a separate area of memory is used for the tag and marker bits, as for example is the case in the earlier illustrated example of FIG. 3B. At step 350, the separate memory area can be accessed to read the tag and marker values for each capability sized block of data within the identified memory region. This process can be repeated for each memory region if more than one memory region is identified at step 305 of FIG. 6. At step 355, based on the accessed tag and marker values each valid capability having a marker value of interest can be identified, these capabilities being considered as candidates for revocation. Whilst the tag and marker values can be retrieved "as is" from the separate area of memory and then assessed at step 355, in an alternative implementation the query performed in respect of the separate area of memory may only return an indication for each valid capability that does have a marker value of interest.

At step 360, each identified valid capability that is a candidate for revocation (as determined by step 355) can be retrieved from memory and it can then be assessed whether the revocation condition is met using the process discussed earlier with reference to FIG. 6. Thereafter, the process can continue with step 315 of FIG. 6 discussed earlier, where each capability for which the revocation condition is met can be revoked.

Figure 8:
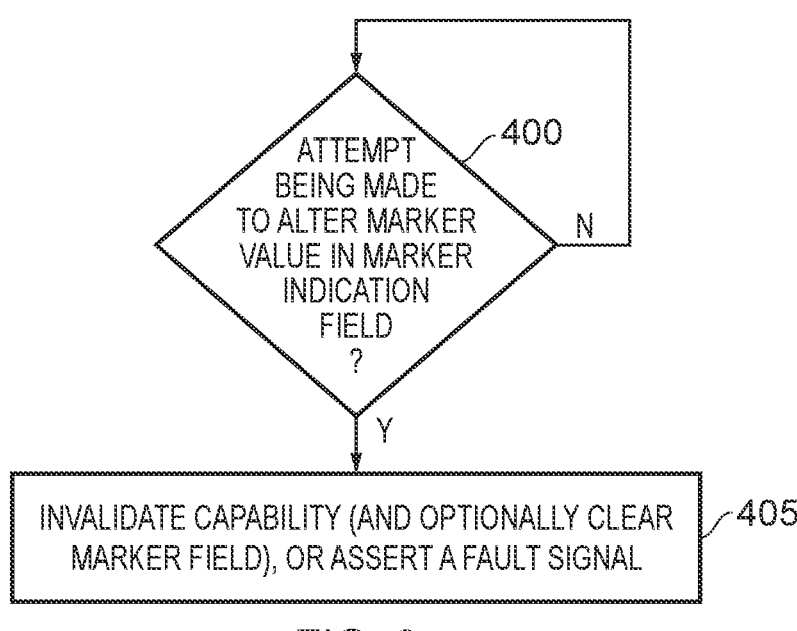
FIG. 8 is a flow diagram illustrating how an attempt to alter a marker value in the marker indication field of a capability is handled, in accordance with one example implementation.

FIG. 8 is a flow diagram illustrating how attempts to alter marker values can be handled in accordance with one example implementation. At step 400, it can be detected when any attempt is being made to alter a marker value in a marker indication field associated with a valid capability. Upon detecting such an attempt, then at step 405 that capability can be invalidated, for example by clearing the tag bit. Optionally, if desired, the marker field can also be cleared, but this is not a requirement as clearing the tag bit will always be sufficient, since it will render the capability invalid and hence unable to be used in association with any subsequent memory access. In one particular example implementation, a particularly robust mechanism for clearing the tag bit is to write an all zeros value to the memory location containing the capability, which has the effect of clearing the tag bit and indeed the other bits specifying the capability. As also indicated in FIG. 8, as an alternative to invalidating the capability, a fault signal could instead be asserted at step 405 to trigger software to evaluate how to proceed.

Figure 9:
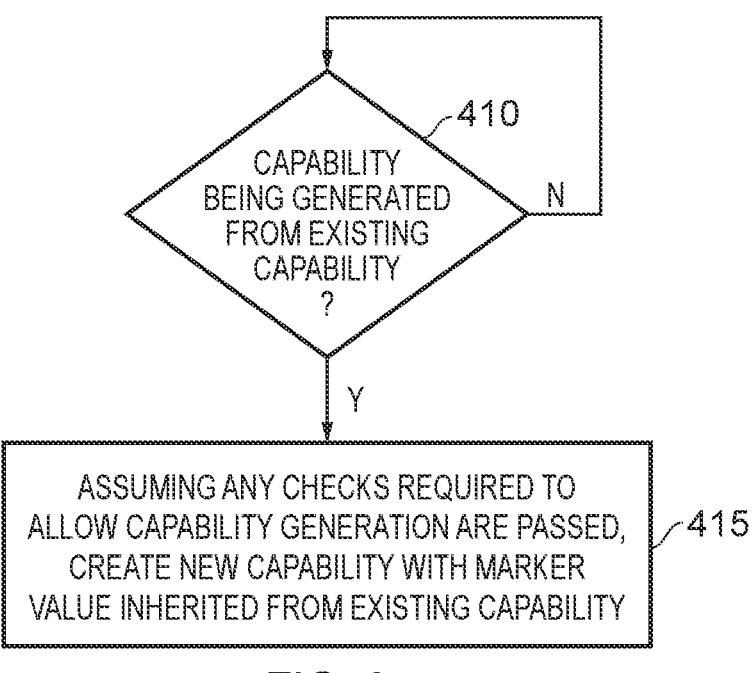
FIG. 9 is a flow diagram illustrating how a capability may be generated from an existing capability, in accordance with one example implementation.

FIG. 9 is a flow diagram illustrating a restriction that can be applied when it is sought to generate a capability from an existing capability. As indicated by step 410, when such a situation is detected, then at step 415, assuming any checks required to allow the capability generation process to be performed are satisfied, then the new capability could be created from the existing capability, with the marker value being inherited from that existing capability. Hence, when capabilities are derived from existing capabilities, they can be enforced to inherit the marker value of the existing capability. If desired, the ability to derive capabilities from existing capabilities can be limited to certain modes of operation, for example when the processing circuitry is executing certain privileged or trusted code.

Figure 10A:
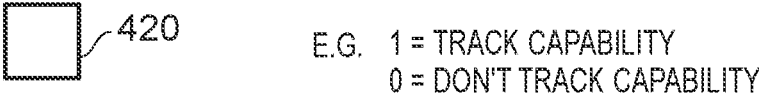
FIGS. 10A to 10C illustrate various different formats of the marker indication field, in accordance with some example implementations.
Figure 10B:
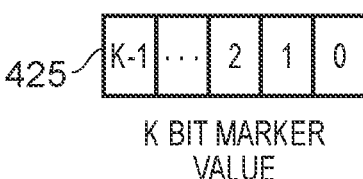
Figure 10C:
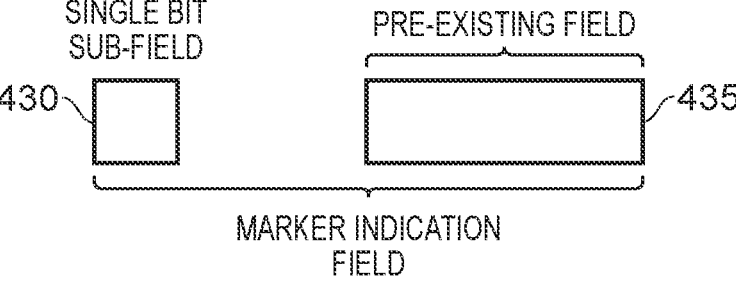

FIGS. 10A to 10C illustrate different arrangements of marker indication field that may be used. In FIG. 10A, a single bit field 420 is used, and in the illustrated example a logic one value in that field indicates that the associated capability should be tracked whilst a logic zero value indicates that the associated capability should not be tracked. It will be appreciated that the meaning of the logic one and zero values could be reversed in an alternative implementation.

In FIG. 10B, a multi-bit marker indication field 425 is used, and in particular a K-bit marker value is illustrated. One particular value, for example an all zeros value, may be used to indicate that the associated capability should not be tracked. However, a variety of other different non-zero marker values can be used to indicate a capability that is to be tracked, where the marker value used in association with any given capability may for example be dependent on the allocation condition that was present at the time that given capability was allocated for use by the processing circuitry.

The allocation condition could take a variety of forms. For example, as discussed earlier, the allocation condition may be arranged to depend on a current generation of memory allocation for which capabilities are being allocated, such that different marker values can be associated with different generations of memory allocations. As other examples, the allocation condition may be arranged to depend on a thread of execution of the processing circuitry for which capabilities are being allocated, and hence different marker values can be associated with different threads of execution, or the allocation condition may be arranged to depend on an allocation identifier associated with a capability allocation process, where the capability allocation process is arranged to implement a plurality of capability allocator instances and the allocation identifier indicates a current capability allocator instance.

FIG. 10C illustrates a yet further alternative implementation for the marker indication field, where the marker indication field is formed from two separate sub-fields. For example, a single bit sub-field 430 may be provided, which is used in combination with the contents of a pre-existing field 435 to form a multi-bit marker value. The pre-existing field can take a variety of forms, but in one example is an object type field that may already be provided in association with the capability to identify the type of capability, for example whether the capability is a normal capability or a sealed capability. This would hence, for example, allow the marker value to be varied dependent on the type of capability indicated by the object type field.

Figure 11A:
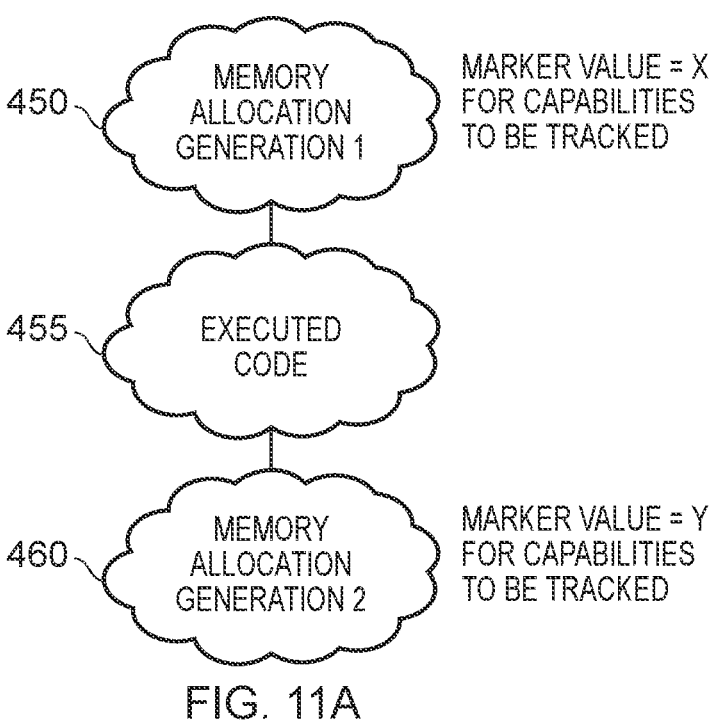
FIG. 11A illustrates how different marker values may be associated with different memory allocation generations in one example implementation, whilst
Figure 11B:
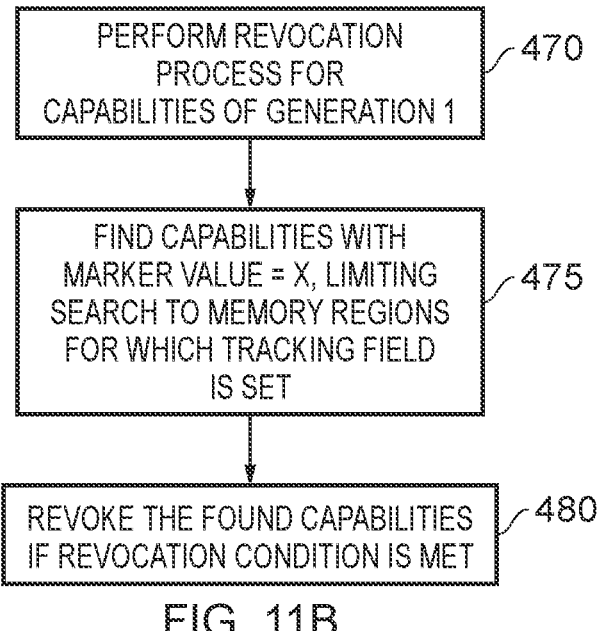
FIG. 11B illustrates steps that may be performed when performing revocation for capabilities of a particular memory allocation generation, in accordance with one example implementation.

FIGS. 11A and 11B schematically illustrate how different marker values may be used with different generations of memory allocation, to allow generational revocation of capabilities. As illustrated in FIG. 11A, a first memory allocation generation process 450 may be used to allocate blocks of memory, and those blocks of memory may then be used when executing the code 455. Thereafter, there may be another generation of memory allocation 460 performed, for example to obtain and allocate another portion of memory for use by subsequent code. As shown in FIG. 11A, different marker values (X and Y in the illustrated example) may be used for capabilities that are to be tracked, dependent on whether those capabilities are associated with memory regions allocated by the first memory allocation generation or the second memory allocation generation. In one example implementation, a single capability tracking circuit could maintain one or more tracking structures to separately track, for each of a plurality of memory regions, the writing of capabilities having the marker value X and capabilities having the marker value Y, or alternatively different memory tracking circuits could be provided, each being arranged to track the writing of capabilities having one of those different marker values.

As indicated by the flow diagram of FIG. 11B, if at step 470 a revocation trigger is detected that causes a revocation process to be performed in respect of capabilities associated with the first memory allocation generation, then at step 475 the earlier described processes can be used to locate those valid capabilities which have a marker value of X (this being the marker value associated with tracked capabilities used to access memory allocated by the first memory allocation generation). Then, at step 480, for each of the located capabilities, that capability can be revoked if the revocation condition is met, the revocation condition being assessed using any of the techniques described earlier.

Figure 12A:
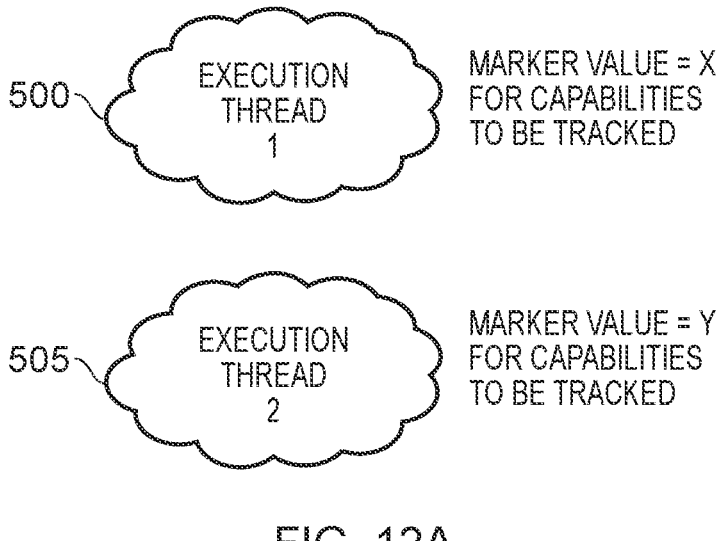
FIGS. 12A and 12B illustrate other example scenarios where different marker values may be used in association with capabilities that are to be tracked.

FIG. 12A illustrates a different example situation where multiple different marker values may be used. In this particular example, a marker value of X is used in association with capabilities that are allocated for use by the processing circuitry when executing execution thread 1 500, whilst a marker value of Y is used in association with capabilities that are allocated for use by the processing circuitry when executing execution thread 2 505. Such an approach can allow a capability tracking circuit to track certain capabilities associated with a particular execution thread, for example dynamic capabilities used by that execution thread, so that for example such capabilities can more readily later be revoked once the execution thread is no longer being executed, using the revocation process described earlier.

Figure 12B:
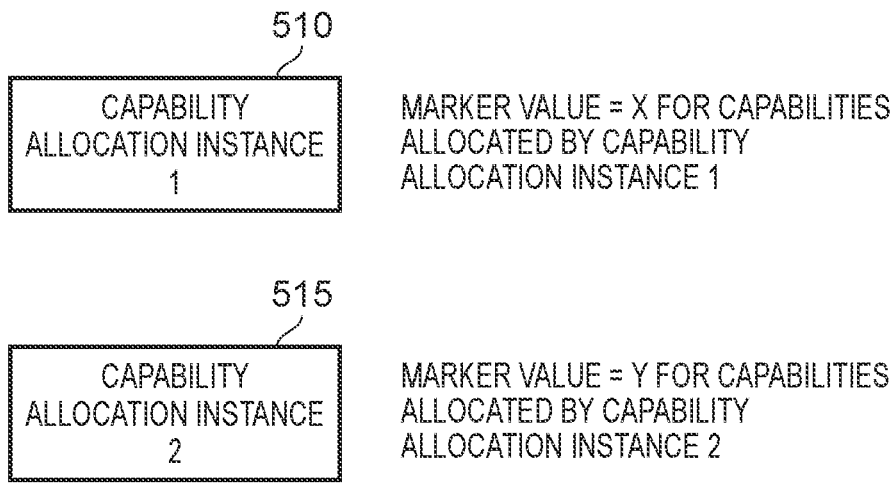

FIG. 12B illustrates a yet further example of the use of different marker values, where a marker value of X is used for capabilities that are allocated by a first capability allocation instance 510, whilst a marker value of Y is used for capabilities that are allocated by a second capability allocation instance 515. There are a variety of scenarios where it may be appropriate to use different capability allocation instances. For example, the system may provide different allocators with different permissions or associated memory regions. For instance, there may be an operating system level allocator that can allocate privileged memory and associated capabilities for use by the kernel code, and a distinct thread level allocator that operates with lower permissions and that can allocate memory and associated capabilities for use by individual execution threads. As a particular example use case, one such allocator could be associated with kmalloc (kernel malloc in Linux) whilst another allocator could be associated with malloc in user space.

Figure 13:
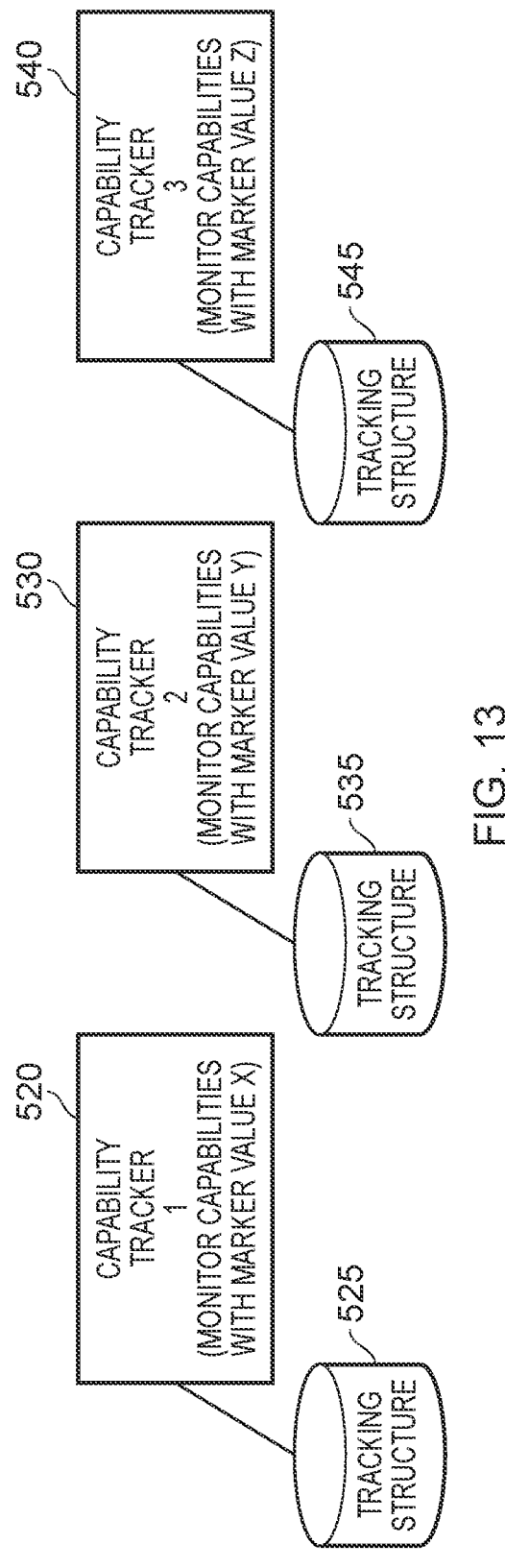
FIG. 13 is a diagram schematically illustrating the use of multiple capability trackers, in one example implementation.

FIG. 13 schematically illustrates how different capability trackers can be used in one example implementation. In this example three capability trackers 520, 530, 540 are provided, each of which has its own associated tracking structure 525, 535 and 545. These different capability trackers can be used in a variety of ways, but in the example shown each capability tracker is provided to monitor capabilities with a different marker value, and hence the first capability tracker 520 monitors capabilities with the marker value X, the second capability tracker 530 monitors capabilities with the marker value Y and the third capability tracker 540 monitors capabilities with the marker value Z. Each capability tracker will maintain within its associated tracking structure information for a number of different memory regions, and in particular will identify for each memory region when one or more capabilities having the monitored marker value are written to that memory region.

Figure 14:
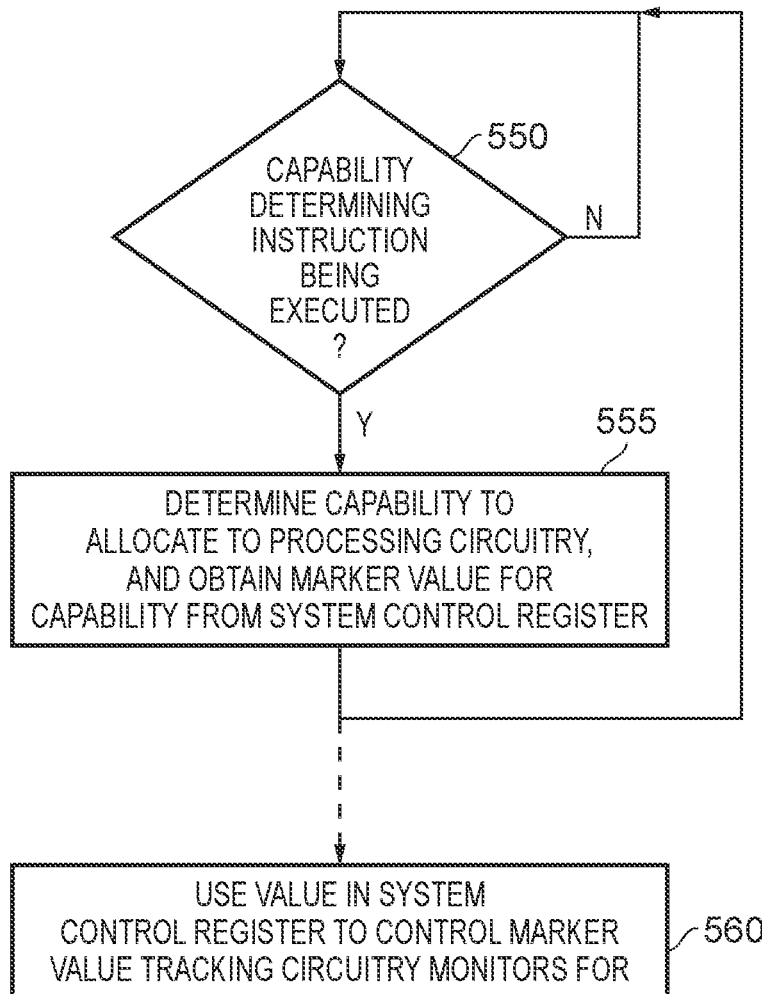
FIG. 14 is a flow diagram illustrating steps that may be performed when it is detected that a capability determining instruction is to be executed, in accordance with one example implementation.

FIG. 14 is a flow diagram illustrating one example implementation where a capability determining instruction is provided for execution by the processing circuitry. At step 550, once such an instruction is being executed, then at step 555 execution of the instruction will cause a capability to be determined for allocation to the processing circuitry. Such a determined capability could for example be derived from a pre-existing capability. However, in addition, at step 555, the marker value that is used in association with the determined capability is obtained from a system control register, such as one of the system control registers 28 shown in FIG. 1. This provides a great deal of flexibility in the choice of marker value, since that marker value (or information used to derive it) can be stored within a system control register, and updated as and when required by software executing at the required level of privilege. It may also be the case that the value in the relevant system control register changes on a context switch, and as a result different marker values can be used in association with different execution contexts.

As also shown in FIG. 14, if desired, then at step 560 the value in the system control register can also be used to control the marker value that a capability tracking circuit is arranged to monitor within its associated tracking structure, hence controlling which capabilities are tracked in dependence on the information stored in the system control register.

Whilst the contents of the system control register may directly identify the marker value, in an alternative implementation the information in the system control register may be used to derive the marker value, for example by performing some computation on the value in the system control register.

Figure 15:
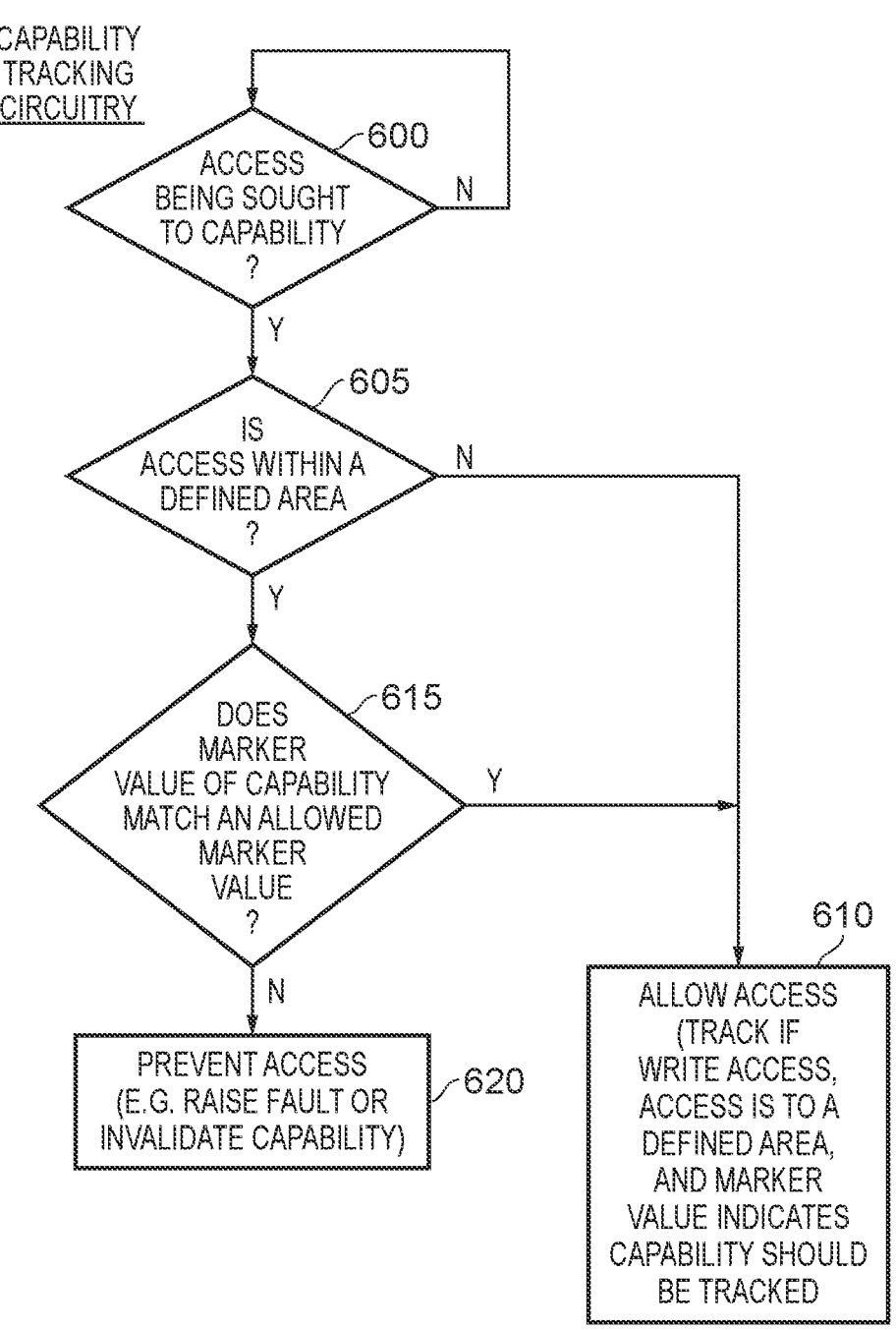
FIG. 15 is a flow diagram illustrating steps that may be taken upon detecting that an access is being sought to a capability, in accordance with one example implementation.

FIG. 15 is a flow diagram illustrating how the marker values can also be used in some implementations to control access to certain capabilities, in addition to their use in association with the earlier described tracking mechanisms used to track the writing to memory of capabilities with certain marker values. In accordance with the technique described in FIG. 15, when at step 600 it is determined that an access is being sought to a capability in memory, at step 605 it is determined whether that access is within a defined area of memory. In particular, one or more defined areas in memory can be established where certain limitations on access to capabilities is to be applied. If the access is not within a defined area of memory, then at step 610 the access is allowed to proceed.

If at step 605 it is determined that the access is within one or more defined areas, then at step 615 it is determined whether the marker value of the capability matches an allowed marker value. For example, one or more allowed marker values may be associated with each defined area, such that only capabilities having one of the allowed marker values can be accessed within those defined areas. If at step 615 it is determined that the marker value of the capability does match an allowed marker value, then the process proceeds to step 610 where the access is allowed. If the access is a read access, then the capability may merely be read from memory. Conversely, if the access is a write access, then in situations where the write access is being performed to the defined area and the marker value indicates that the capability should be tracked, then an update will be made to the appropriate tracking structure 26 by the relevant capability tracking circuit 24 in order to keep track of the fact that that write operation has been performed.

If at step 615 it is determined that the marker value is not an allowed marker value, then at step 620 access to memory is prevented. The access could be prevented in a variety of ways. For example, a fault could be raised to trigger software to evaluate the fault condition. Alternatively, steps could be taken to invalidate the capability. For example, for a write access the capability could be written to memory, but with the tag bit cleared to effectively invalidate the capability. For a read access, then the underlying value in memory could be left unaltered, but the value read into the register could have the tag bit cleared to invalidate the copy that has been loaded. Such a mechanism can be useful for a variety of reasons, for example to prevent processing circuitry from seeking to make use of stale capabilities that are no longer relevant to the processing being performed by the processing circuitry.

Figure 16:
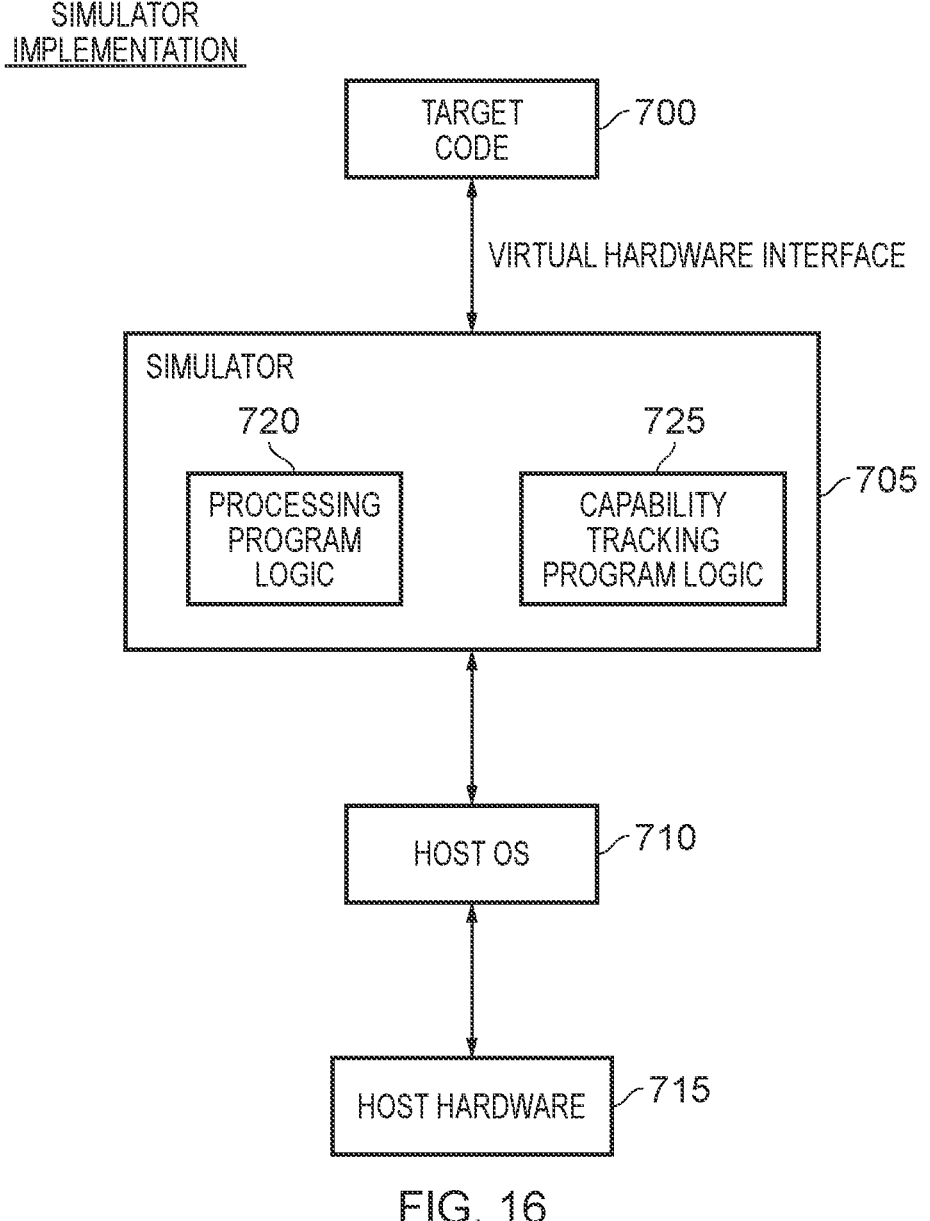
FIG. 16 provides an example of a simulator implementation that may be used.

FIG. 16 illustrates a simulator implementation that may be used. Whilst the earlier described examples implement the present invention in terms of apparatus and methods for operating specific processing hardware supporting the techniques concerned, it is also possible to provide an instruction execution environment in accordance with the examples described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 715, optionally running a host operating system 710, supporting the simulator program 705. In some arrangements there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990, USENIX Conference, Pages 53 to 63.

To the extent that examples have previously been described with reference to particular hardware constructs or features, in a simulated implementation equivalent functionality may be provided by suitable software constructs or features. For example, particular circuitry may be provided in a simulated implementation as computer program logic. Similarly, memory hardware, such as register or cache, may be provided in a simulated implementation as a software data structure. Also, the physical address space used to access memory 8 in the hardware apparatus 2 could be emulated as a simulated address space which is mapped on to the virtual address space used by the host operating system 710 by the simulator 705. In arrangements where one or more of the hardware elements referenced in the previously described examples are present on the host hardware (for example host processor 715), some simulated implementations may make use of the host hardware, where suitable.

The simulator program 705 may be stored on a computer readable storage medium (which may be a non-transitory medium), and provides a virtual hardware interface (instruction execution environment) to the target code 700 (which may include applications, operating systems and a hypervisor) which is the same as the hardware interface of the hardware architecture being modelled by the simulator program 705. Thus, the program instructions of the target code 700 may be executed from within the instruction execution environment using the simulator program 705, so that a host computer 715 which does not actually have the hardware features of the apparatus 2 discussed above can emulate those features. The simulator program may include processing program logic 720 to emulate the behaviour of the processing circuitry 4, and capability tracking program logic 725 to emulate the behaviour of the capability tracking circuitry 24 of the hardware apparatus 2 of FIG. 1. Hence, the techniques described herein for managing capabilities can in the example of FIG. 16 be performed in software by the simulator program 705.

The techniques described herein provide a particularly efficient and performant mechanism for tracking certain capabilities for subsequent revocation. In accordance with the described techniques, a capability tracking circuit can be used to track capabilities, in particular to keep track of the writing of certain capabilities to one or more memory regions. Further, by using the marker value in association with each capability, this tracking functionality can be limited to certain capabilities of interest, for example certain dynamic capabilities that have been provided for use by the processing circuitry in association with a dynamically allocated region of memory. By such an approach, when such dynamically allocated memory is subsequently deallocated, a more targeted approach can be used to identify the capabilities within memory that should be invalidated so as to alleviate the potential for such stale capabilities to remain available and potentially be misused.

Other examples are set out in the following clauses:

1. An apparatus comprising:

processing circuitry to perform operations during which access requests to memory are generated, wherein the processing circuitry is arranged to generate memory addresses for the access requests using capabilities, where each capability is arranged to indicate a pointer value and constraining information used to constrain access to memory using memory addresses derived from the pointer value, and wherein a marker indication field is stored in association with each capability to provide a marker value used to distinguish between static capabilities used to access statically allocated memory and dynamic capabilities used to access dynamically allocated memory; and capability tracking circuitry to maintain a tracking structure providing a tracking field for each of a plurality of memory regions, wherein the capability tracking circuitry is arranged to set the tracking field for a given memory region amongst the plurality of memory regions when at least one capability whose associated marker indication field has a specified marker value is written to the given memory region, where the specified marker value indicates that writing of the associated capability to memory is to be tracked by the capability tracking circuitry to facilitate subsequent revocation of that associated capability.

2. The apparatus of Clause 1, wherein:

the processing circuitry is arranged, responsive to a revocation trigger, to implement in respect of each memory region whose tracking field in the tracking structure is set, a revocation process to identify each stored capability within that memory region whose associated marker indication field has the specified marker value and, for each identified stored capability, to revoke that identified stored capability provided a revocation condition is met for that identified stored capability.

3. The apparatus of Clause 2, wherein for each capability the constraining information comprises at least range constraining information indicating an allowable range of memory addresses accessible using the pointer value, and for a given identified stored capability the revocation condition is determined to be met when the allowable range of memory addresses includes one or more memory addresses within a block of memory that has been deallocated.

4. The apparatus of Clause 2 or Clause 3, wherein:

the marker indication fields are stored in a separate area of memory accessible independently of a memory address space storing the associated capabilities;

the processing circuitry is arranged, for a given memory region whose tracking field in the tracking structure is set, to obtain from the separate area of memory the marker indication fields associated with each capability stored within that given memory region, and then, for each obtained marker indication field whose marker value is the specified marker value, is arranged to read the associated capability from the memory region and determine whether the revocation condition is met for that associated capability.

5. The apparatus of Clause 4, wherein the separate area of memory is further arranged to store a valid capability indication field associated with each capability sized block of data in memory, where each valid capability indication field is used to identify whether the associated capability sized block of data in memory stores a valid capability, and the processing circuitry is arranged, for the given memory region whose tracking field in the tracking structure is set, to identify each valid capability that has the specified marker value in dependence on the valid capability indication fields and the marker indication fields stored in the separate area of memory.

6. The apparatus of any preceding clause, further comprising:

memory handling circuitry to allocate one or more blocks of memory for use by the processing circuitry and to subsequently deallocate a previously allocated block of memory when the processing circuitry no longer requires access to that previously allocated block of memory;

wherein, responsive to the memory handling circuitry allocating a given block of memory for use by the processing circuitry, the processing circuitry is arranged to be provided with one or more capabilities for use by the processing circuitry when accessing the given block of memory.

7. The apparatus of any preceding clause, wherein each marker indication field is constrained such that, once the marker value has been stored in that marker indication field, the marker value within the marker indication field is prohibited from being modified unless the associated capability is invalidated.

8. The apparatus of any of clauses 1 to 6, wherein each marker indication field is constrained such that, once the marker value has been stored in that marker indication field, any attempt to modify the marker indication field causes a fault signal to be asserted.

9. The apparatus of any preceding clause, wherein the processing circuitry is enabled, at least in one mode of operation, to perform a capability generation operation to derive a new capability from an existing capability, and is constrained when deriving the new capability to ensure that the new capability inherits the marker value associated with the existing capability.

10. The apparatus of any preceding clause, wherein the capability tracking circuitry is arranged to prevent a capability having the specified marker value from being written to a memory address within one or more restricted memory regions.

11. The apparatus of any preceding clause, wherein the marker indication field is a single bit value, the specified marker value being a first value settable within the marker indication field, and a second value settable within the marker indication field being used to identify that storing of the associated capability to memory is not to be tracked by the capability tracking circuitry.

12. The apparatus of any of clauses 1 to 10, wherein the marker indication field is a multi-bit field, and the marker value used to indicate that a given capability is to be tracked is selected dependent on an allocation condition present at the time the given capability is provided for use by the processing circuitry.

13. The apparatus of Clause 12, wherein the allocation condition is arranged to depend on at least one of:

a current generation of memory allocation for which capabilities are being allocated, where memory handling circuitry is arranged to allocate one or more blocks of memory for use by the processing circuitry in a series of generations of memory allocations;

a thread of execution of the processing circuitry for which capabilities are being allocated;

an allocation identifier associated with a capability allocation process, where the capability allocation process is arranged to implement a plurality of capability allocator instances and the allocation identifier indicates a current capability allocator instance.

14. The apparatus of Clause 12 or Clause 13, wherein:

the capability tracking circuitry comprises a plurality of capability trackers;

each capability tracking circuitry has at least one associated marker value; and each capability tracker is arranged to maintain a separate tracking structure providing a tracking field for each of a plurality of memory regions, and is arranged to set the tracking field for a given memory region amongst the plurality of memory regions when at least one capability whose associated marker indication field has the at least one associated marker value is written to the given memory region.

15. The apparatus of any of clauses 12 to 14, wherein the marker indication field is formed by a single bit marker indication sub-field and a pre-existing field of the associated capability, and the marker value provided by the marker indication field is determined from a combination of the value of the single bit marker indication sub-field and a value of the pre-existing field.

16. The apparatus of any preceding clause, wherein the processing circuitry is arranged to execute a capability determining instruction to determine a capability for use by the processing circuitry, where execution of the capability determining instruction causes the marker value of the determined capability to be derived from a control value in a system control register of the apparatus.

17. The apparatus of Clause 16, wherein the control value in the system control register is also used to control the specified marker value that the capability tracking circuitry is looking for when reviewing capabilities being written to memory.

18. The apparatus of any preceding clause, wherein the capability tracking circuitry is arranged, for at least one or more defined areas of memory, to only permit memory accesses of at least one type to be performed in respect of valid capabilities whose marker value matches one or more predefined values.

19. The apparatus of Clause 18, wherein the capability tracking circuitry is arranged to prevent a valid capability being loaded from memory unless that capability has an associated marker value that matches the one or more predefined values.

20. The apparatus of any preceding clause, further comprising an enable flag storage whose value is settable to selectively enable and disable the capability tracking circuitry.

21. The apparatus of any preceding clause, wherein the tracking field is a saturating counter, and the capability tracking circuitry is configured to increment the saturating counter for the given memory region each time a capability whose associated marker indication field has the specified marker value is written to the given memory region.

22. The apparatus of any preceding clause, wherein the capability tracking circuitry is arranged to clear the tracking field for the given memory region upon invalidation of all capabilities written to the given memory region whose associated marker indication field had the specified marker value.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:

processing circuitry configured to perform operations during which access requests to memory are generated, wherein the processing circuitry is configured to generate memory addresses for the access requests using capabilities, where each capability is configured to indicate a pointer value and constraining information used to constrain access to memory using memory addresses derived from the pointer value, and wherein a marker indication field is stored in association with each capability to provide a marker value used to distinguish between static capabilities used to access statically allocated memory and dynamic capabilities used to access dynamically allocated memory; and capability tracking circuitry configured to maintain a tracking structure providing a tracking field for each of a plurality of memory regions, wherein in response to at least one capability being written to a given memory region among the plurality of memory regions, the capability tracking circuitry is configured to determine, in dependence on whether the marker value of the marker indication field associated with said at least one capability and used to distinguish between static and dynamic capabilities indicates that writing of said at least one capability to memory is to be tracked by the capability tracking circuitry to facilitate subsequent revocation of said at least one capability, whether to set the tracking field for the given memory region.

2. The apparatus as claimed in claim 1, wherein:

the processing circuitry is configured, responsive to a revocation trigger, to implement in respect of each memory region whose tracking field in the tracking structure is set, a revocation process to identify each stored capability within that memory region whose associated marker indication field has the specified value and, for each identified stored capability, to revoke that identified stored capability provided a revocation condition is met for that identified stored capability.

3. The apparatus as claimed in claim 2, wherein for each capability the constraining information comprises at least range constraining information indicating an allowable range of memory addresses accessible using the pointer value, and for a given identified stored capability the revocation condition is determined to be met when the allowable range of memory addresses includes one or more memory addresses within a block of memory that has been deallocated.

4. The apparatus as claimed in claim 2, wherein:

the marker indication fields are stored in a separate area of memory accessible independently of a memory address space storing the associated capabilities;

the processing circuitry is configured, for a given memory region whose tracking field in the tracking structure is set, to obtain from the separate area of memory the marker indication fields associated with each capability stored within that given memory region, and then, for each obtained marker indication field whose marker value is the specified value, is configured to read the associated capability from the memory region and determine whether the revocation condition is met for that associated capability.

5. The apparatus as claimed in claim 4, wherein the separate area of memory is further configured to store a valid capability indication field associated with each capability sized block of data in memory, where each valid capability indication field is used to identify whether the associated capability sized block of data in memory stores a valid capability, and the processing circuitry is configured, for the given memory region whose tracking field in the tracking structure is set, to identify each valid capability that has the specified value in dependence on the valid capability indication fields and the marker indication fields stored in the separate area of memory.

6. The apparatus as claimed in claim 1, further comprising:

memory handling circuitry configured to allocate one or more blocks of memory for use by the processing circuitry and to subsequently deallocate a previously allocated block of memory when the processing circuitry no longer requires access to that previously allocated block of memory;

wherein, responsive to the memory handling circuitry allocating a given block of memory for use by the processing circuitry, the processing circuitry is configured to be provided with one or more capabilities for use by the processing circuitry when accessing the given block of memory.

7. The apparatus as claimed in claim 1, wherein each marker indication field is constrained such that, once the marker value has been stored in that marker indication field, the marker value within the marker indication field is prohibited from being modified unless the associated capability is invalidated.

8. The apparatus as claimed in claim 1, wherein each marker indication field is constrained such that, once the marker value has been stored in that marker indication field, any attempt to modify the marker indication field causes a fault signal to be asserted.

9. The apparatus as claimed in claim 1, wherein the processing circuitry is enabled, at least in one mode of operation, to perform a capability generation operation to derive a new capability from an existing capability, and is constrained when deriving the new capability to ensure that the new capability inherits the marker value associated with the existing capability.

10. The apparatus as claimed in claim 1, wherein the capability tracking circuitry is configured to prevent a capability having the specified value from being written to a memory address within one or more restricted memory regions.

11. The apparatus as claimed in claim 1, wherein the marker indication field is a single bit value, the specified value being a first value settable within the marker indication field, and a second value settable within the marker indication field being used to identify that storing of the associated capability to memory is not to be tracked by the capability tracking circuitry.

12. The apparatus as claimed in claim 1, wherein the marker indication field is a multi-bit field, and the marker value used to indicate that a given capability is to be tracked is selected dependent on an allocation condition present at the time the given capability is provided for use by the processing circuitry.

13. The apparatus as claimed in claim 12, wherein the allocation condition is configured to depend on at least one of:

a current generation of memory allocation for which capabilities are being allocated, where memory handling circuitry is configured to allocate one or more blocks of memory for use by the processing circuitry in a series of generations of memory allocations;

a thread of execution of the processing circuitry for which capabilities are being allocated;

an allocation identifier associated with a capability allocation process, where the capability allocation process is configured to implement a plurality of capability allocator instances and the allocation identifier indicates a current capability allocator instance.

14. The apparatus as claimed in claim 12, wherein:

the capability tracking circuitry comprises a plurality of capability trackers;

each capability tracker has at least one associated marker value; and each capability tracker is configured to maintain a separate tracking structure providing a tracking field for each of a plurality of memory regions, and is configured to set the tracking field for a given memory region amongst the plurality of memory regions when at least one capability whose associated marker indication field has the at least one associated marker value is written to the given memory region.

15. The apparatus as claimed in claim 12, wherein the marker indication field is formed by a single bit marker indication sub-field and a pre-existing field of the associated capability, and the marker value provided by the marker indication field is determined from a combination of the value of the single bit marker indication sub-field and a value of the pre-existing field.

16. The apparatus as claimed in claim 1, wherein the processing circuitry is configured to execute a capability determining instruction to determine a capability for use by the processing circuitry, where execution of the capability determining instruction causes the marker value of the determined capability to be derived from a control value in a system control register of the apparatus.

17. The apparatus as claimed in claim 16, wherein the control value in the system control register is also used to control the specified value that the capability tracking circuitry is looking for when reviewing capabilities being written to memory.

18. The apparatus as claimed in claim 1, wherein the capability tracking circuitry is configured, for at least one or more defined areas of memory, to only permit memory accesses of at least one type to be performed in respect of valid capabilities whose marker value matches one or more predefined values.

19. The apparatus as claimed in claim 18, wherein the capability tracking circuitry is configured to prevent a valid capability being loaded from memory unless that capability has an associated marker value that matches the one or more predefined values.

20. The apparatus as claimed in claim 1, further comprising an enable flag storage whose value is settable to selectively enable and disable the capability tracking circuitry.

21. The apparatus as claimed in claim 1, wherein the tracking field is a saturating counter, and the capability tracking circuitry is configured to increment the saturating counter for the given memory region each time a capability whose associated marker indication field has the specified value is written to the given memory region.

22. The apparatus as claimed in claim 1, wherein the capability tracking circuitry is configured to clear the tracking field for the given memory region upon invalidation of all capabilities written to the given memory region whose associated marker indication field had the specified value.

23. A method of operating an apparatus to track capabilities for revocation, comprising:

employing processing circuitry to perform operations during which access requests to memory are generated, wherein the processing circuitry generates memory addresses for the access requests using capabilities, where each capability is configured to indicate a pointer value and constraining information used to constrain access to memory using memory addresses derived from the pointer value;

storing a marker indication field in association with each capability to provide a marker value used to distinguish between static capabilities used to access statically allocated memory and dynamic capabilities used to access dynamically allocated memory;

maintaining, using capability tracking circuitry, a tracking structure providing a tracking field for each of a plurality of memory regions; and in response to at least one capability being written to a given memory region amongst the plurality of memory regions, determining, in dependence on whether the marker value of the marker indication field associated with said at least one capability and used to distinguish between static and dynamic capabilities indicates that writing of the associated capability to memory is to be tracked by the capability tracking circuitry to facilitate subsequent revocation of that associated capability, whether to set the tracking field for the given memory region.

24. A non-transitory computer readable storage medium having stored thereon a program for controlling a host data processing apparatus to provide an instruction execution environment, the program comprising:

processing program logic to perform operations during which access requests to memory are generated, wherein the processing program logic is configured to generate memory addresses for the access requests using capabilities, where each capability is configured to indicate a pointer value and constraining information used to constrain access to memory using memory addresses derived from the pointer value, and wherein a marker indication field is stored in association with each capability to provide a marker value used to distinguish between static capabilities used to access statically allocated memory and dynamic capabilities used to access dynamically allocated memory; and capability tracking program logic to maintain a tracking structure providing a tracking field for each of a plurality of memory regions, wherein in response to at least one capability being written to a given memory region amongst the plurality of memory regions, the capability tracking program logic is configured to determine, in dependence on whether the marker value of the marker indication field associated with said at least one capability and used to distinguish between static and dynamic capabilities indicates that writing of the associated capability to memory is to be tracked by the capability tracking circuitry to facilitate subsequent revocation of that associated capability, whether to set the tracking field for the given memory region.

* * * * *